(12) United States Patent
Ling et al.

(10) Patent No.: US 12,247,924 B2
(45) Date of Patent: Mar. 11, 2025

(54) PLATFORM FOR STAND-OFF AND REAL-TIME SERS SENSING OF AIRBORNE ANALYTES

(71) Applicant: Nanyang Technological University, Singapore (SG)

(72) Inventors: Xing Yi Ling, Singapore (SG); Gia Chuong Phan Quang, Singapore (SG)

(73) Assignee: Nanyang Technological University, Singapore (SG)

( * ) Notice: Subject to any disclaimer, the term of this patent is extended or adjusted under 35 U.S.C. 154(b) by 277 days.

(21) Appl. No.: 17/625,841

(22) PCT Filed: Jul. 30, 2020

(86) PCT No.: PCT/SG2020/050438
§ 371 (c)(1),
(2) Date: Jan. 10, 2022

(87) PCT Pub. No.: WO2021/021024
PCT Pub. Date: Feb. 4, 2021

(65) Prior Publication Data
US 2022/0258232 A1 Aug. 18, 2022

(30) Foreign Application Priority Data
Jul. 31, 2019 (SG) .......................... 10201907052Q

(51) Int. Cl.
*G01N 21/65* (2006.01)
*B22F 1/054* (2022.01)
(Continued)

(52) U.S. Cl.
CPC ......... *G01N 21/658* (2013.01); *B22F 1/0553* (2022.01); *B22F 7/04* (2013.01); *B82Y 30/00* (2013.01); *B22F 2999/00* (2013.01)

(58) Field of Classification Search
CPC ...... B22F 1/0553; B22F 2999/00; B22F 7/04; B22F 1/056; B22F 1/102; B22F 1/17;
(Continued)

(56) References Cited

U.S. PATENT DOCUMENTS

2001/0002315 A1* 5/2001 Schultz ............ G06K 19/06084
435/6.13

FOREIGN PATENT DOCUMENTS

| CN | 107436300 A | * | 12/2017 | ............ B22F 1/0062 |
| CN | 107436300 B | * | 8/2019  | ............ B22F 1/0062 |

OTHER PUBLICATIONS

Cao et al.; Diurnal variations of atmospheric polycyclic aromatic hydrocarbons; (PAHs) during three sequent winter haze episodes in Beijing, China; Sci. Total Environ., 2018, 625, 1486-1493.
(Continued)

*Primary Examiner* — Tri T Ton
(74) *Attorney, Agent, or Firm* — Patterson + Sheridan, LLP

(57) ABSTRACT

Disclosed herein is a composite material suitable for use in surface-enhanced Raman scattering, the material comprising a substrate layer having a surface; a plurality of layers of core-shell particles formed on the surface of the substrate layer, wherein the core is formed from a plasmonic metal nanoparticle, and the shell is formed from a metal-organic framework (MOF), and wherein the plurality of layers of core-shell particles provide a thickness of from 0.5 to 10 um on the surface of the substrate layer. In specific embodiments, the plasmonic metal nanoparticles are silver nanocubes, and the MOF is ZIF-8.

10 Claims, 14 Drawing Sheets

Figure 1:
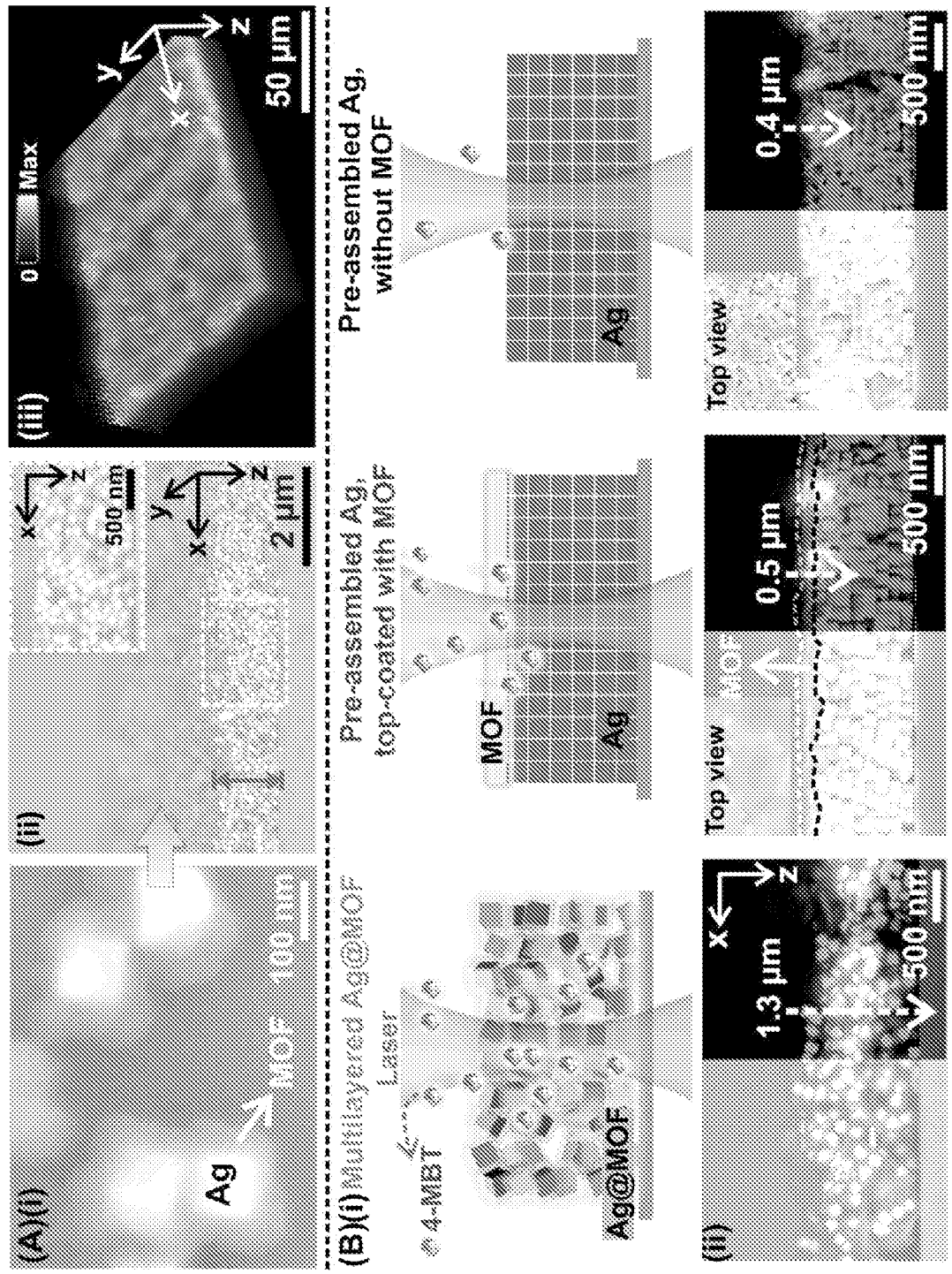
Figure 1:
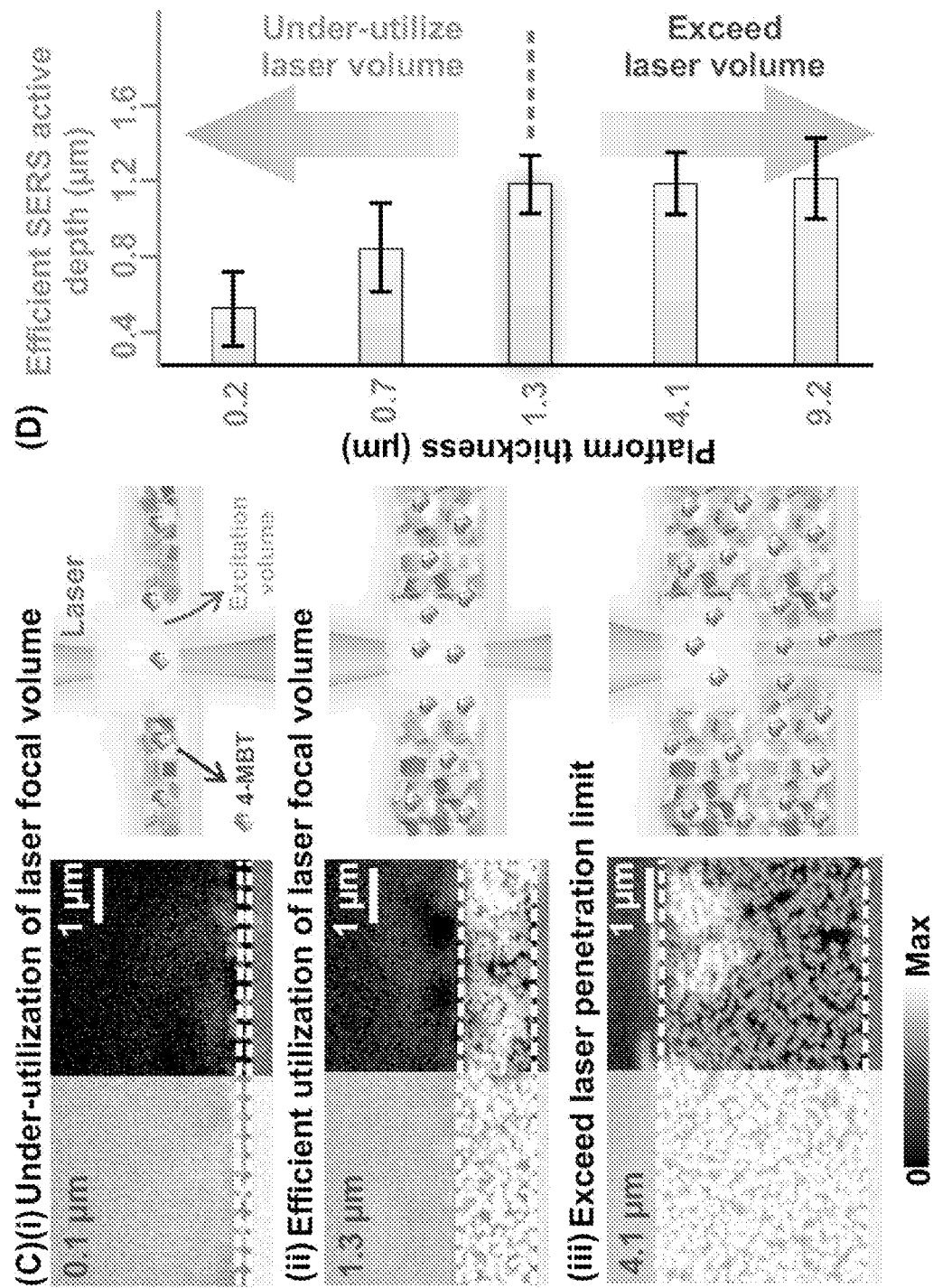

(51) Int. Cl.
 *B22F 7/04* (2006.01)
 *B82Y 30/00* (2011.01)
(58) Field of Classification Search
 CPC ......... B82Y 15/00; B82Y 20/00; B82Y 30/00;
                                              G01N 21/658
 USPC ....................................................... 356/341
 See application file for complete search history.

(56) References Cited

OTHER PUBLICATIONS

Carey et al.; Measurement of the Raman spectrum of liquid water; J. Chem. Phys., 1998, 108, 2669-2675.
Chen et al; Layer-By-Layer Assembly of Ag Nanowires into 3D Woodpile-like; Structures to Achieve High Density "Hot Spots" for Surface-Enhanced Raman Scattering; Langmuir, 2013, 29, 7061-7069.
Chernikova et al.; Highly sensitive and selective SO2 MOF sensor: the; integration of MFM-300 MOF as a sensitive layer on a capacitive interdigitated electrode; J. Mater. Chem. A, 2018, 6, 5550-5554.
Chou et al.; SERS substrate for detection of explosives; Nanoscale, 2012, 4, 7419-7424.
Cleary; Results from a Full-Scale Smoke Alarm; Sensitivity Study; Fire Technology, 2014, 50 (3), 775-790.
Cui et al.; Ultrahigh and Selective SO2 Uptake in Inorganic Anion-Pillared Hybrid Porous Materials; Adv. Mater., 2017, 29, 1606929.
Fan et al.; A review on the fabrication of substrates for surface enhanced Raman; spectroscopy and their applications in analytical chemistry; Anal. Chim. Acta., 2011, 693, 7-25.
Gopalsami et al.; Millimeter-Wave Radar Sensing of Airborne Chemicals; IEEE Trans. Microw. Theory Tech., 2001, 49, 646-653.
Gu et al.; SERS Sensors: Recent Developments and a Generalized Classification Scheme Based on the Signal Origin; Annu. Rev. Anal. Chem., 2018, 11, 147-169.
Kodiyath; Assemblies of silver nanocubes for highly sensitive SERS chemical vapor detection; J. Mater. Chem. A, 2013, 1, 2777-2788.
Lee et al.; Plasmonic Liquid Marbles: A Miniature Substrate-less SERS Platform for Quantitative and Multiplex Ultratrace Molecular Detection; Angew. Chem. Int. Ed., 2014, 53, 5054-5058.
Lee et al.; Designing surface-enhanced Raman scattering (SERS) platforms beyond hotspot engineering: emerging opportunities in analyte manipulations and hybrid materials; Chem. Soc. Rev., 2019, 48, 731-756.
Lee et al.; Driving CO2 to a Quasi-Condensed Phase at the Interface between a Nanoparticle Surface and a Metal-Organic Framework at 1 bar and 298 K; J. Am. Chem. Soc., 2017, 139, 11513-11518.
Lee et al.; Direct Metal Writing and Precise Positioning of Gold Nanoparticles within Microfluidic Channels for SERS Sensing of Gaseous Analytes; ACS Appl. Mater. Interfaces, 2017, 9, 39584-39593.
LEE: Creating two self-assembly micro-environments to achieve supercrystals with dual structures using polyhedral nanoparticles; Nat. Commun., 2018, 9, 2769.
Li et al; Superhydrophobic-Oleophobic Ag Nanowire Platform: An Analyte-Concentrating and Quantitative Aqueous and Organic Toxin Surface-Enhanced Raman Scattering Sensor; Anal. Chem., 2014, 86, 10437-10444.
Love et al.; Self-Assembled Monolayers of Thiolates on Metals as a Form of Nanotechnology; Chem. Rev., 2005, 105, 1103-1169.
Macia et al.; Hybrid Silver Nanocubes for Improved Plasmon-Enhanced Singlet Oxygen Production and Inactivation of Bacteria; J. Am. Chem. Soc., 2019, 141, 1, 684-692.

Moros et al.; Fundamentals of stand-off Raman scattering spectroscopy for explosive fingerprinting; J. Raman Spectrosc., 2013, 44, 121-130.
Mosier-Boss; Review of SERS Substrates for Chemical Sensing; Nanomaterials, 2017, 7, 142.
Oh et al.; Highly sensitive VOC gas sensor employing deep cooling of SERS film; J. Raman Spectrosc., 2018, 49, 800-809.
Phan-Quang et al.; Isolating Reactions at the Picoliter Scale: Parallel Control of Reaction Kinetics at the Liquid-Liquid Interface; Angew. Chem. Int. Ed., 2016, 55, 8304-8308.
Phan-Quang et al.; Plasmonic Colloidosomes as Three-Dimensional SERS Platforms with Enhanced Surface Area for Multiphase Sub-Microliter Toxin Sensing; Angew. Chem. Int. Ed., 2015, 54, 9691-9695.
Phan-Quang et al.; Plasmonic Hotspots in Air: An Omnidirectional Three-Dimensional Platform for Stand-Off In-Air SERS Sensing of Airborne Species; Angew. Chem. Int. Ed., 2018, 57, 5792-5796.
Qualey ; Fire Test Comparisons of Smoke Detector Response Times; Fire Technology, 2000, 36, 89-108.
Rauh et al.; Compression of hard core-soft shell nanoparticles at liquid-liquid interfaces: influence of the shell thickness; Soft Matter, 2017, 13, 158-169.
Scaffidi et al.; Trace Molecular Detection via Surface-Enhanced Raman; Scattering and Surface-Enhanced Resonance Raman Scattering at a Distance of 15 Meters; Appl. Spectrosc., 2010, 64, 485-492.
Sharma; New trends in telescopic remote Raman spectroscopic instrumentation; Spectrochim. Acta A Mol. Biomol. Spectrosc., 2007, 68, 1008-1022.
Sim et al.; Concentrating Immiscible Molecules at Solid@MOF Interfacial Nanocavities to Drive an Inert Gas-Liquid Reaction at Ambient Conditions; Angew. Chem. Int. Ed. 2018, 57, 17058-17062.
Hobro; Stand-off Raman Spectroscopy; TrAC, Trends Anal. Chem. 2009, 28, 1235-1242.
Wallin et al.; Laser-based standoff detection of explosives: a critical review; Anal. Bioanal. Chem., 2009, 395, 259-274.
Wang et al.; Metal-Organic Frameworks for Energy Applications; ; Chem, 2017, 2, 52-80.
Xu et al.; Metal-Organic Frameworks for Resonant-Gravimetric Detection of Trace-Level Xylene Molecules; Anal. Chem., 2016, 88, 12234-12240.
Yin et al.; Thermal stability of ZIF-8 under oxidative and inert environments: A practical perspective on using ZIF-8 as a catalyst support; Chem. Eng. J. 2015, 278, 293-300.
Zhu et al.; Technical Development of Raman Spectroscopy: From Instrumental to Advanced Combined Technologies; Appl. Spectrosc. Rev., 2014, 49, 64-82.
Zong; Intracellular pH Sensing Using p-Aminothiophenol Functionalized Gold Nanorods with Low Cytotoxicity; Anal. Chem., 2011, 83, 4178-4183.
International Search Report and Written Opinion in related application PCT/SG2020/050438 dated Oct. 23, 2020.
Andrade, G. F. S. et al., Multilayer silver nanoparticles-modified optical fiber tip for high performance SERS remote sensing. Biosensors and Bioe/ectronics, A 1 O Mar. 2010, vol. 25, pp. 2270-2275 [Retrieved on Oct. 8, 2020] <DOI: 10.1016/J.BIOS.2010.03.007>.
Koh, C. S. L. et al., Plasmonic nose: integrating the MOF-enabled molecular preconcentration effect with a plasmonic array for recognition of molecular-level volatile organic compounds. Chem. Commun., Feb. 13, 2018, vol. 54, pp. 2546-2549 [Retrieved on Oct. 8, 2020] <DOI: 10.1039/C8CC00564H>.
Phan-Quang, G. C. et al., Tracking Airborne Molecules from Afar: ThreeDimensional Metal-Organic Framework-Surface-Enhanced Raman Scattering Platform for Stand-Off and Real-Time Atmospheric Monitoring. ACS Nano, Sep. 13, 2019, vol. 13, pp. 12090-12099 [Retrieved on Oct. 8, 2020] <DOI: 10.1021 /ACSNANO. 9B06486>.

* cited by examiner

PLATFORM FOR STAND-OFF AND REAL-TIME SERS SENSING OF AIRBORNE ANALYTES

FIELD OF INVENTION

This invention relates to a composite material for use in surface-enhanced Raman scattering (SERS), a method for making the composite material, and its use for detecting one or more of a gas and a volatile organic chemical using SERS. The invention may be particularly useful in SERS conducted at remote distance.

BACKGROUND

The listing or discussion of a prior-published document in this specification should not necessarily be taken as an acknowledgement that the document is part of the state of the art or is common general knowledge.

Stand-off Raman spectroscopy combines the advantages of both Raman spectroscopy and long-range detection to identify chemicals at distant and/or inaccessible sites, providing an early indication of potential disasters and/or unhealthy air quality. Typically performed at meter-range distances, stand-off Raman measurements give rise to molecular-specific vibrational fingerprints that can differentiate molecules of similar chemical structures and thus avert false signals. It also benefits from no interference from water in the common fingerprint region between 600-1700 $cm^{-1}$, thereby rendering it highly appealing for outdoor detection even in humid conditions.

However, stand-off Raman suffers from intrinsically weak intensity ($10^{-6}$ scattering probability) which further aggravates with increasing distance (intensity $\propto 1/d^2$). As such, current stand-off Raman detection is restricted to the detection of pure solids/liquids and it is still not possible to detect diluted airborne species (such as gases and aerosols), even when using a high laser power (~400 mW) and a long integration time (>1 minute) (*TrAC, Trends Anal. Chem.* 2009, 28 (11), 1235-1242). This weak sensitivity greatly hampers the use of stand-off Raman for remote threat/chemical detection and air quality monitoring because majority of explosives, volatile organic compounds and greenhouse gases exist in highly dispersed airborne conditions.

Surface-enhanced Raman scattering (SERS) potentially addresses the above problems by enhancing Raman signals of target airborne molecules by >$10^8$-fold when they are in close proximity to the surface of plasmonic nanostructures. Using 2D plasmonic substrates of Ag and/or Au nanoparticles, ultrasensitive detections of small airborne molecules such as $CO_2$ and toxic aromatic compounds have been realized using significantly lower operating laser power of tens of mW (*Chem. Commun.* 2018, 54 (20), 2546-2549).

However, the facile coupling of conventional 2D SERS platforms and stand-off Raman system remains a huge challenge owing to the following two main reasons. First, typical stand-off Raman system with large focal depth (mm to cm) is underutilized due to the shortage of plasmonic hotspot along the z-direction of common nanometer-thick 2D SERS platforms, which are designed for microscopic systems with sub-micrometer resolution. Correspondingly, this inefficient utilization of stand-off laser excitation volume will lead to poor signal read-out due to the signal contribution from ambient interferences present in the laser volume. Second, current attempts in stand-off SERS rely on plasmonic particles that are unable to actively capture analytes from the air (*Appl. Spectrosc.* 2010, 64 (5), 485-492), making it unsuitable for the detection of randomly-dispersed airborne molecules that have no affinity to metal, especially in an open ambient environment.

Hence, there remains a need for improved materials and methods that solves one or more problems mentioned above to enable stand-off SERS detection of airborne species.

SUMMARY OF INVENTION

Aspects and embodiments of the invention will now be described in more detail by reference to the following numbered clauses.

1. A composite material suitable for use in surface-enhanced Raman scattering, the material comprising:
    a substrate layer having a surface;
    a plurality of layers of core-shell particles formed on the surface of the substrate layer, wherein:
    the core-shell particles comprise:
        a core formed from a plasmonic metal nanoparticle; and
        a shell formed from a metal-organic framework; and
        the plurality of layers of core-shell particles provides a thickness of from 0.5 to 10 µm on the surface of the substrate layer.

2. The composite material according to Clause 1, wherein the plasmonic metal nanoparticles are selected from one or more of the group consisting of plasmonic gold nanoparticles, plasmonic silver nanoparticles, plasmonic platinum nanoparticles, and plasmonic palladium nanoparticles.

3. The composite material according to Clause 2, wherein the plasmonic metal nanoparticles are plasmonic silver nanoparticles.

4. The composite material according to any one of the preceding clauses, wherein the plasmonic metal nanoparticles are provided as one or more of the group selected from nanopolyhedra, nanospheres, nanowires, nanorods, nanobowls, and nanoplates, optionally wherein the plasmonic metal nanoparticles are nanoporous.

5. The composite material according to Clause 4, wherein, when the plasmonic metal nanoparticles are provided as nanopolyhedra, they have four or more faces, optionally wherein the nanopolyhedra are selected from one or more nanopolyhedra having from 5 to 30 faces, for example the nanopolyhedra are nanocubes or nanooctahedra.

6. The composite material according to Clause 5, wherein the nanopolyhedra are provided as nanocubes.

7. The composite material according to any one of the preceding clauses, wherein the metal organic framework is selected from one or more of the group consisting of UIO-66, ZIF-8, kag-MOF-1, MFM-300, HKUST-1, SIFSIX-1-Cu, and ZIF-71.

8. The composite material according to any one of the preceding clauses, wherein the plurality of layers of core-shell particles provides a thickness of from 0.8 to 5 µm on the surface of the substrate layer or at least 1.3 µm on the surface of the substrate layer.

9. The composite material according to Clause 8, wherein the plurality of layers of core-shell particles provides a thickness of from 1 to 2 µm on the surface of the substrate layer.

10. The composite material according to Clause 9, wherein the plurality of layers of core-shell particles provides a thickness of about 1.3 µm on the surface of the substrate layer.

11. The composite material according to any one of the preceding clauses, wherein the plurality of layers of core-shell particles provide from 5 to 30 layers of core-shell particles on the surface of the substrate layer.

12. The composite material according to Clause 11, wherein the plurality of layers of core-shell particles provide from 8 to 20 layers of core-shell particles on the surface of the substrate layer.

13. The composite material according to Clause 12, wherein the plurality of layers of core-shell particles provide from 10 to 15 layers of core-shell particles on the surface of the substrate layer.

14. The composite material according to any one of the preceding clauses, wherein:
   (a) the core-shell particles in the plurality of layers are packed with an interparticle distance of less than 10 nm, such as from 0.1 to 9.8 nm; and/or
   (b) the core-shell particles have a size of from 100 nm to 1,000 nm, such as from 200 to 600 nm, such as from 300 to 500 nm; and/or
   (c) the shell layer has a thickness of from 5 nm to 100 nm, such as from 10 to 80 nm; and/or
   (d) a surface of the plasmonic metal nanoparticles is bonded to 4-methylbenzene thiol; and/or
   (e) the substrate is a silicon substrate.

15. The composite material according to any one of preceding clauses, wherein:
   (ai) the plasmonic metal nanoparticles are silver nanocubes; and/or
   (aii) the metal organic framework is selected from one of the group consisting of UIO-66, ZIF-8, kag-MOF-1, MFM-300, HKUST-1, SIFSIX-1-Cu, and ZIF-71; and/or
   (aiii) the plurality of layers of core-shell particles provide a thickness of about 1.3 μm on the surface of the substrate layer; and/or
   (aiv) the plurality of layers of core-shell particles provide from 10 to 15 layers of core-shell particles on the surface of the substrate layer.

16. The composite material according to Clause 15, wherein:
   the plasmonic metal nanoparticles are silver nanocubes;
   the metal organic framework is ZIF-8; and
   the plurality of layers of core-shell particles are provided in from 10 to 15 layers and provide a thickness of about 1.3 μm, optionally wherein a surface of the silver nanocubes are bonded to 4-methylbenzene thiol.

17. A method of forming a composite material according to any one of Clauses 1 to 16, which method comprises:
   (ci) providing a substrate having a surface and a solution comprising a solvent and core-shell particles comprising:
      a core formed from a plasmonic metal nanoparticle; and
      a shell formed from a metal-organic framework; and
   (cii) placing a portion of the solution onto the surface of the substrate and allowing the solvent to evaporate to provide the composite material.

18. The method according to Clause 17, wherein the solvent in the solution is an organic alcohol.

19. The method according to Clause 18, wherein the solvent in the solution is an organic alcohol that has three or more carbon atoms and is linear or branched, optionally wherein the organic alcohol is 1-propanol.

20. The method according to any one of Clauses 17 to 19, wherein the concentration of the core-shell particles is from 0.5 to 20 mg/mL and the substrate has a surface area of from 0.5×0.5 cm.

21. A composite material suitable for use in surface-enhanced Raman scattering, the material comprising:
   a substrate layer having a surface;
   a plurality of layers of plasmonic metal nanoparticles formed on the surface of the substrate layer, wherein:
      the plurality of layers of plasmonic metal nanoparticles provide a thickness of from 0.3 to 10 μm on the surface of the substrate layer.

22. The composite material according to Clause 21, wherein the composite material further comprises a layer of a metal-organic framework, which is formed on a surface provided by the plurality of layers of plasmonic metal nanoparticles, optionally wherein the total thickness of the plurality of layers of plasmonic metal nanoparticles and the layer of a metal-organic framework is from 0.4 to 10 μm on the surface of the substrate layer.

23. The composite material according to Clause 21 or Clause 22, wherein the plasmonic metal nanoparticles are selected from one or more of the group consisting of plasmonic gold nanoparticles, plasmonic silver nanoparticles, plasmonic platinum nanoparticles, and plasmonic palladium nanoparticles.

24. The composite material according to Clause 23, wherein the plasmonic metal nanoparticles are plasmonic silver nanoparticles.

25. The composite material according to any one of Clauses 21 to 24, wherein the plasmonic metal nanoparticles are provided as one or more of the group selected from nanopolyhedra, nanospheres, nanowires, nanorods, nanobowls, and nanoplates, optionally wherein the plasmonic metal nanoparticles are nanoporous.

26. The composite material according to Clause 25, wherein, when the plasmonic metal nanoparticles are provided as nanopolyhedra, they have four or more faces, optionally wherein the nanopolyhedra are selected from one or more nanopolyhedra having from 5 to 30 faces, for example the nanopolyhedra are nanocubes or nanooctahedra.

27. The composite material according to Clause 26, wherein the nanopolyhedra are provided as nanocubes.

28. The composite material according to any one of Clauses 22 and Clauses 23 to 27 as dependent upon Clause 22, wherein the metal organic framework is selected from one or more of the group consisting of UIO-66, ZIF-8, kag-MOF-1, MFM-300, HKUST-1, SIFSIX-1-Cu, and ZIF-71.

29. The composite material according to any one of Clauses 21 to 28, wherein the plurality of layers of plasmonic metal nanoparticles provide a thickness of from 0.4 to 1.5 μm, such as from 0.5 to 1 μm, on the surface of the substrate layer.

30. The composite material according to any one of Clauses 22 and Clauses 23 to 29 as dependent upon Clause 22, wherein the plurality of layers of plasmonic metal nanoparticles and the layer of a metal organic framework together provide a thickness of from 0.4 to 1.5 μm, such as from 0.5 to 1 μm on the surface of the substrate layer.

31. The composite material according to any one of Clauses 21 to 30, wherein the plurality of layers of plasmonic metal nanoparticles provide from 5 to 30 layers of plasmonic metal nanoparticles on the surface of the substrate layer.

32. The composite material according to Clause 31, wherein the plurality of layers of plasmonic metal nanoparticles provide from 8 to 20 layers of plasmonic metal nanoparticles on the surface of the substrate layer.

33. The composite material according to Clause 32, wherein the plurality of layers of plasmonic metal nanoparticles provide from 10 to 15 layers of plasmonic metal nanoparticles on the surface of the substrate layer.

34. The composite material according to any one of Clauses 21 to 33, wherein:
(A) the plasmonic metal nanoparticles have a size of from 100 nm to 1,000 nm, such as from 150 to 500 nm, such as from 170 to 250 nm; and/or
(B) a surface of the plasmonic metal nanoparticles is bonded to 4-methylbenzene thiol; and/or
(C) the substrate is a silicon substrate.

35. The composite material according to any one of Clauses 22 and Clauses 23 to 34 as dependent upon Clause 22, wherein:
(AAi) the layer of a metal organic framework has a thickness of from 50 nm to 500 nm, such as from 100 to 300 nm, such as 200 nm; and/or
(AAii) the metal organic framework is selected from one of the group consisting of UIO-66, ZIF-8, kag-MOF-1, MFM-300, HKUST-1, SIFSIX-1-Cu, and ZIF-71.

36. The composite material according to any one of Clauses 21 to 35, wherein:
(di) the plasmonic metal nanoparticles are silver nanocubes; and/or
(dii) the plurality of layers of plasmonic metal nanoparticles provide from 10 to 15 layers of plasmonic metal nanoparticles on the surface of the substrate layer.

37. The composite material according to Clause 35 or Clause 36, wherein:
the plasmonic metal nanoparticles are silver nanocubes;
the metal organic framework is ZIF-8;
the plurality of layers of silver nanocubes are provided in from 10 to 15 layers, optionally wherein a surface of the silver nanocubes are bonded to 4-methylbenzene thiol.

38. A kit of parts comprising:
(bi) a composite material as described in any one of one of Clauses 1 to 16 or Clauses 21 to 37; and
(bii) an excitation and detection means or apparatus.

39. The kit of parts according to Clause 38, wherein:
the excitation and detection means or apparatus comprises a spectrophotometer, a laser and a lens; and/or
the kit further comprises a target housing for the composite material.

40. A method of detecting one or more of a gas and a volatile organic chemical, the method comprising the steps of:
(i) placing a composite material as described in any one of Clauses 1 to 16 or Clauses 21 to 37 at a target site for a period of time;
(ii) using an excitation and detection means or apparatus to provide an excitation signal to the composite material at the target site; and
(iii) detecting a surface-enhanced Raman scattering signal produced by the excitation signal in the composite material at the target site and determining whether the one or more of a gas and a volatile organic compound is present in the composite material, wherein
the detection means or apparatus is set at a distance of from 1 to 20 metres away from the composite material at the target site.

41. The method of detecting one or more of a gas and a volatile organic chemical according to Clause 40, wherein:
(Ci) the detection means or apparatus is set at a distance of from 2 to 10 metres away from the composite material at the target site; and/or
(Cii) the composite material at the target site is placed within a target housing.

42. The method of detecting one or more of a gas and a volatile organic chemical according to Clause 40 or Clause 41, wherein the one or more of a gas and a volatile organic chemical is selected from one or more of CO, $CO_2$, $H_2S$, $SO_x$, and small volatile organic compounds selected from one or more of the group consisting of aromatic hydrocarbons, and aliphatic compounds having up to 10 carbon atoms in a linear chain.

43. The method of detecting one or more of a gas and a volatile organic chemical according to Clause 42, wherein the one or more of a gas and a volatile organic chemical is selected from $CO_2$, $H_2S$, $SO_2$, and small volatile organic compounds selected from one or more of the group consisting of xylene, 4-methylbenzenethiol, toluene, and naphthalene (e.g. 4-methylbenzenethiol, toluene, and naphthalene).

44. The method of detecting one or more of a gas and a volatile organic chemical according to any one of Clauses 40 to 43, wherein the method of detection makes use of a composite material according to any one of Clauses 1 to 16 or Clauses 21 to 37.

45. A method of forming a composite material according to any one of Clauses 21 and 23 to 37 as dependent upon Clause 21, which method comprises:
(ei) providing a substrate having a surface and a solution comprising a solvent and plasmonic metal nanoparticles; and
(eii) placing a portion of the solution onto the surface of the substrate and allowing the solvent to evaporate to provide the composite material.

46. The method according to Clause 45, wherein the solvent in the solution is an organic alcohol.

47. The method according to Clause 46, wherein the solvent in the solution is an organic alcohol that has three or more carbon atoms and is linear or branched, optionally wherein the organic alcohol is 1-propanol.

48. A method of forming a composite material according to any one of Clauses 22 and 23 to 37 as dependent upon Clause 22, which method comprises:
(fi) placing a substrate coated with a plurality of layers of plasmonic metal nanoparticles into a solution comprising a solvent, a metal organic framework metal salt precursor and a metal organic framework organic precursor compound to form an intermediate material;
(fii) removing the intermediate material from the solution, washing and drying it; and
(fii) repeating step (fi) and (fii) from 0 to 5 times with the intermediate material to form the composite material.

49. The method according to Clause 48, wherein the solvent in the solution is an organic alcohol, optionally wherein the second solvent is methanol.

50. The method according to Clause 48 or Clause 49, wherein the substrate coated with a plurality of layers of plasmonic metal nanoparticles is obtained by the method described in any one of Clauses 47 to 49.

DRAWINGS

FIG. 1 3D MOF-SERS platform. (A)(i) SEM image showing a Ag@MOF particle, (ii) cross-sectional SEM image showing the side view of the multilayered Ag@MOF platform and (iii) 3D x-y-z SERS image of a segment of the platform (performed with 20× confocal objective lens). (B)(i) Schemes and (ii) cross-sectional SEM images showing the structure and how airborne molecules are absorbed and detected in different platform configuration. Half of the images in (ii) are overlapped with x-z SERS hyperspectral images (with 100× objective lens) showing the penetration of gaseous 4-methylbenzene thiol (4-MBT) into the platform (Ag in the platforms has no 4-MBT surface groups prior to exposure). (C) (i) SEM images overlapped with x-z SERS images (with 100× objective lens) of Ag@MOF platforms of increasing thickness and (right) schemes showing the hotspot and analyte density within the fixed laser focal volume in when platforms of different thickness are used. (D) Efficient SERS active depth and stand-off intensity (at 2 m) of 4-MBT's 1077 $cm^{-1}$ obtained from platforms of different thickness from 0.2-9.2 μm (with Ag pre-functionalized with 4-MBT).

Figure 2:
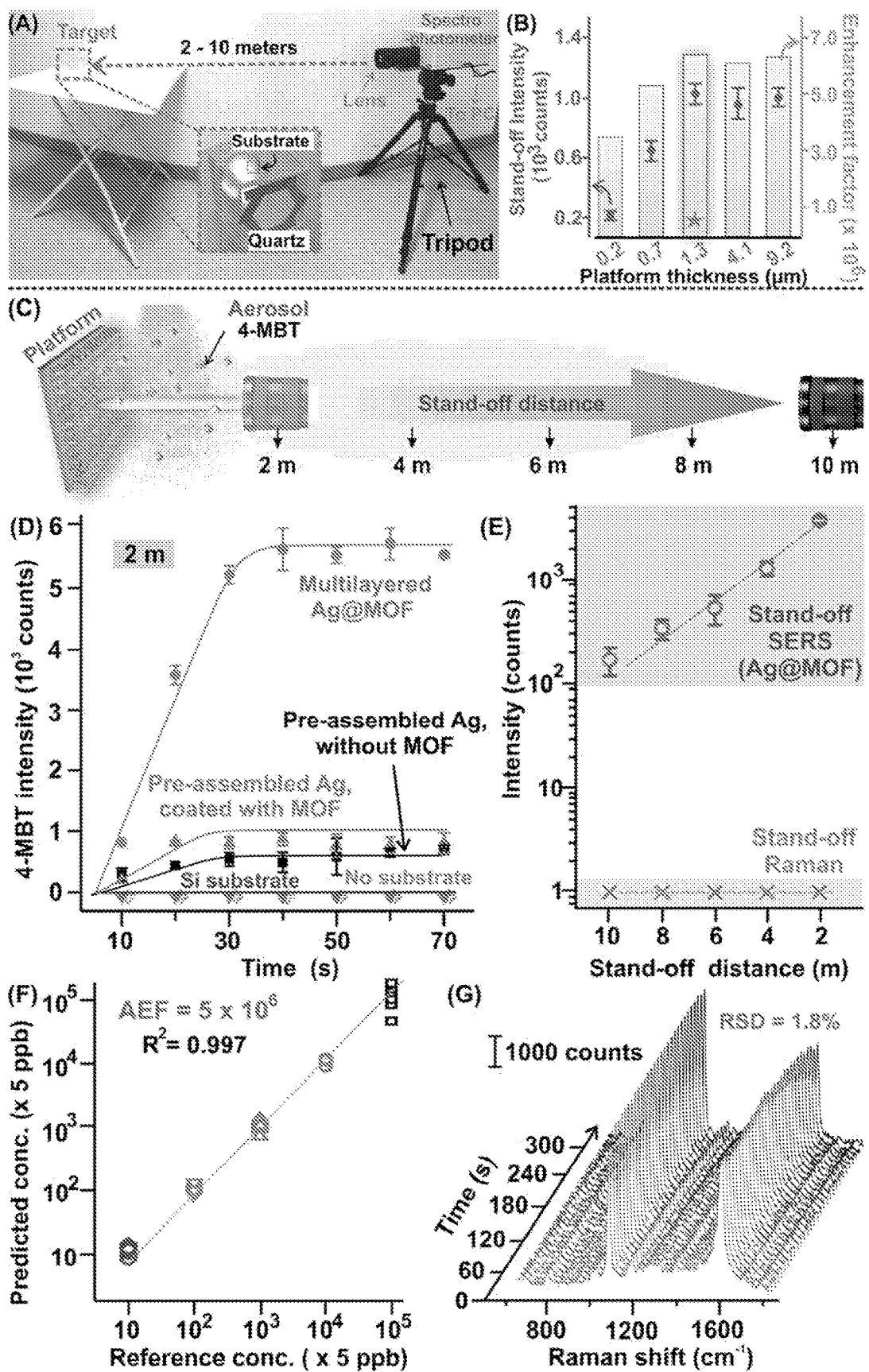

FIG. 2 Stand-off SERS with 3D MOF-SERS platform (A) Set-up of stand-off SERS system. (B) Stand-off intensity (at 2 m) of 4-MBT's 1077 $cm^{-1}$ obtained from platforms of different thickness from 0.2-9.2 μm (with Ag pre-functionalized with 4-MBT). (C) Scheme showing the stand-off SERS detection of aerosolized 4-MBT (500 ppm, Ag in the platforms has no 4-MBT surface groups). (D) Real-time 4-MBT intensity obtained in the stand-off SERS detection on different platforms. (E) 4-MBT intensity obtained at distances from 2 to 10 m (stand-off) with SERS and normal Raman detection. (F) Partial least square calibration graph of different 4-MBT airborne concentrations detected using stand-off SERS (at 2 m). (G) Consistent real-time stand-off spectra of 4-MBT on Ag@MOF substrate for continuous 300 seconds after the substrate has reached saturation.

Figure 3:
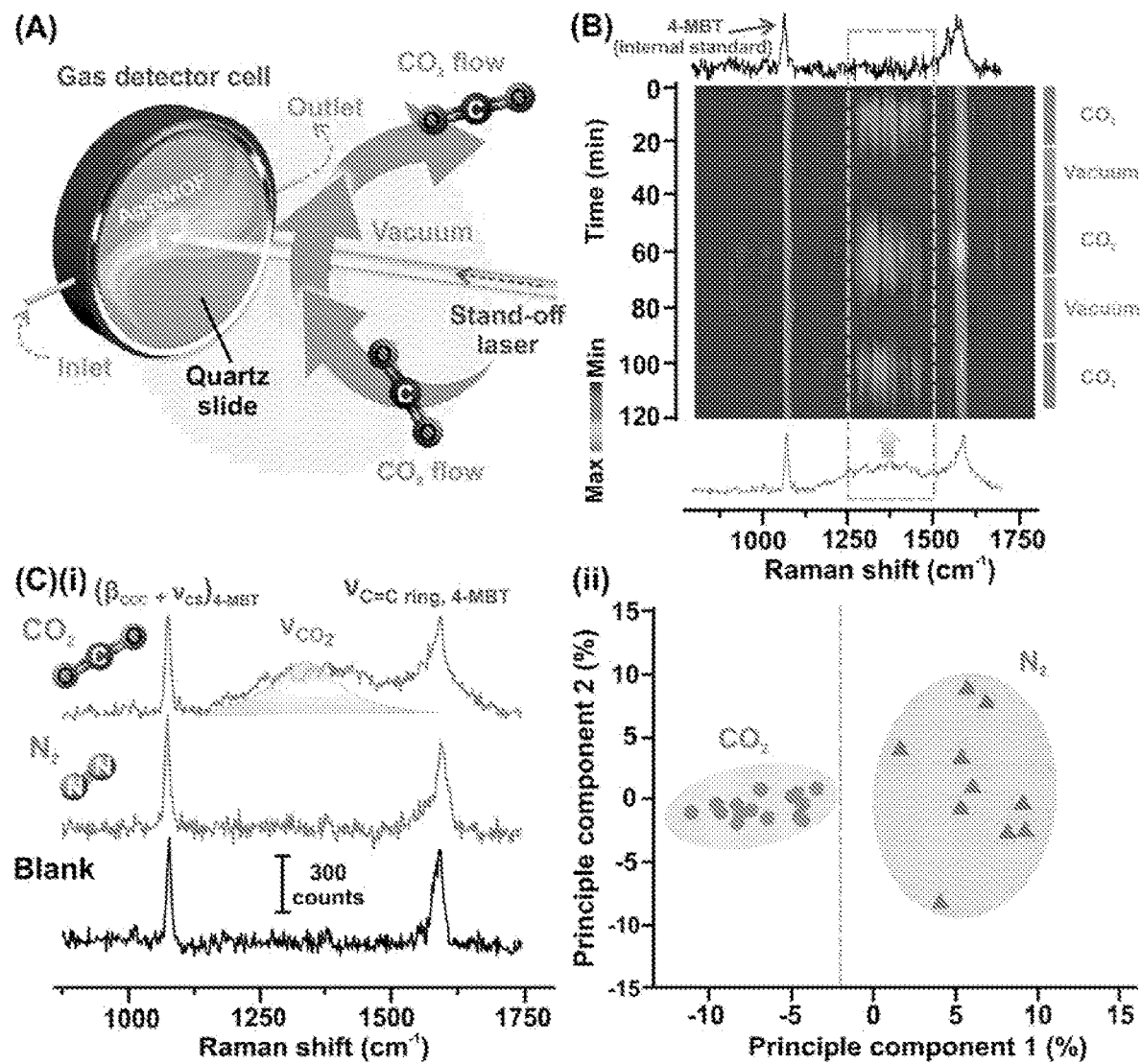

FIG. 3 Remote SERS-based gas detector. (A) Scheme showing remote tracking of $CO_2$ in real time for several cycles with multilayered Ag@MOF platform. (B) Time-resolved SERS intensity profile of 1360 $cm^{-1}$ band, showing the absorption and detection of $CO_2$ in several cycles. (C)(i) Spectroscopic observation of $CO_2$ vibrational modes (shown with respect to internal standard peak of 4-MBT embedded on the particle) in the detection of $CO_2$, which is not observed in the control experiments with $N_2$ flow and no gas (blank), (ii) Principle component analysis (PCA) score plot of stand-off spectra observed in the presence of $CO_2$ and $N_2$.

Figure 4:
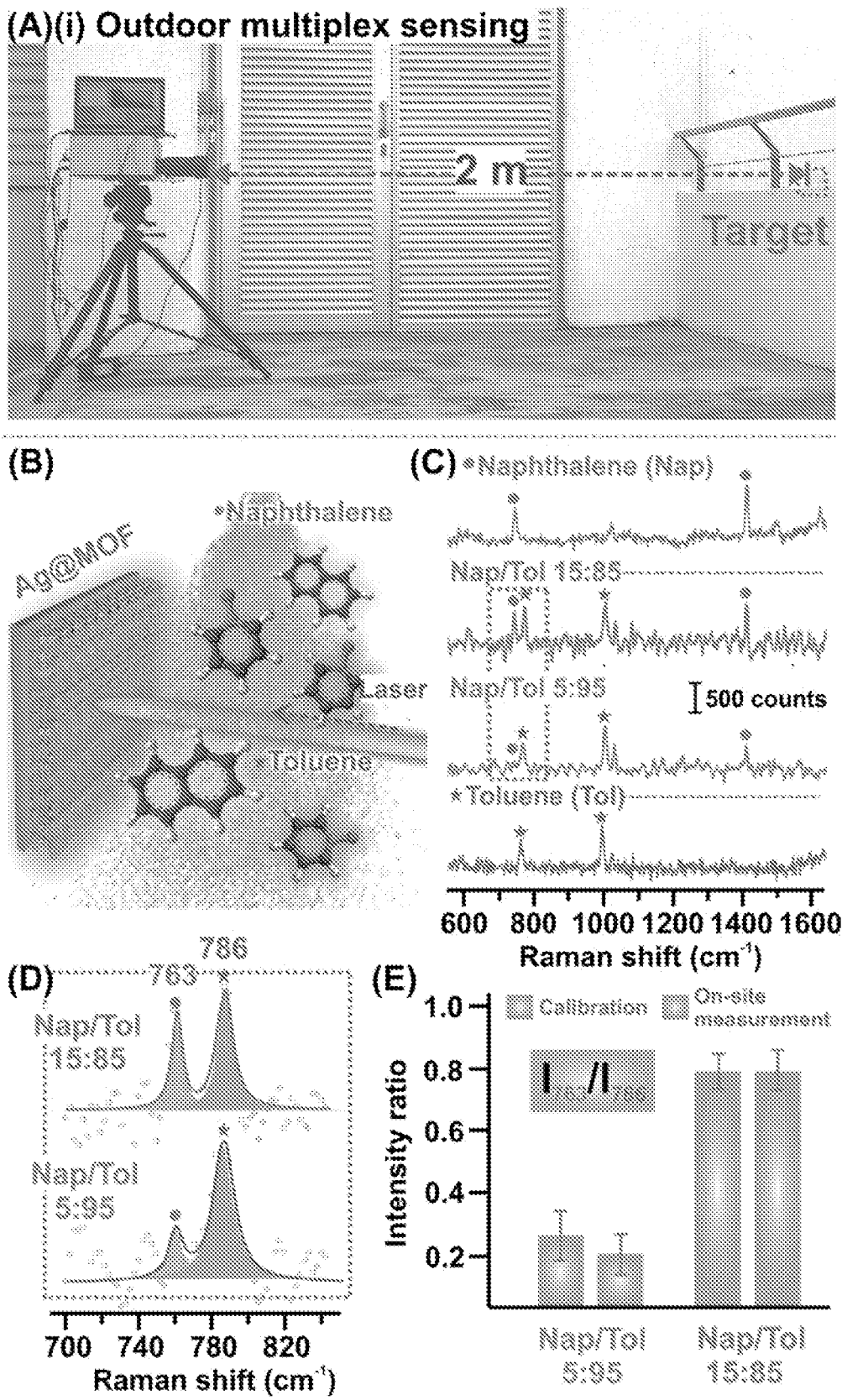

FIG. 4 Outdoor remote sensing of airborne polycyclic aromatic hydrocarbon (PAH) mixture. (A)(i) Outdoor stand-off detection set-up. (B) Scheme showing the stand-off detection of aerosolized toluene and naphthalene. (C) Stand-off multiplex spectra obtained in outdoor condition with natural light, for Nap/Tol 5:95 and 15:85 mixture, with reference to individual naphthalene and toluene SERS spectra. (D) Spectral analysis of characteristic signals of the analytes within the dotted region in (C). (E) Comparison of Nap/Tol signal intensity ratio between calibration spectra and outdoor spectra, using 763 and 786 $cm^{-1}$ signals.

Figure 5:
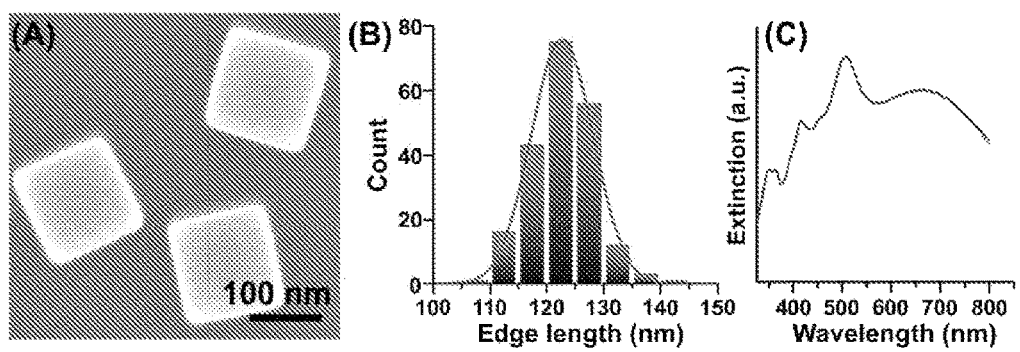

FIG. 5 (A) SEM image of as-synthesized Ag nanocubes and (B) its size distribution (121±5 nm). (C) Extinction spectrum of colloidal Ag nanocubes. The peaks at 348, 412, 525 and 674 nm can be assigned to octupole (348 nm), quadrupole (412 nm and 525 nm), and dipole resonances (674 nm), respectively.

Figure 6:
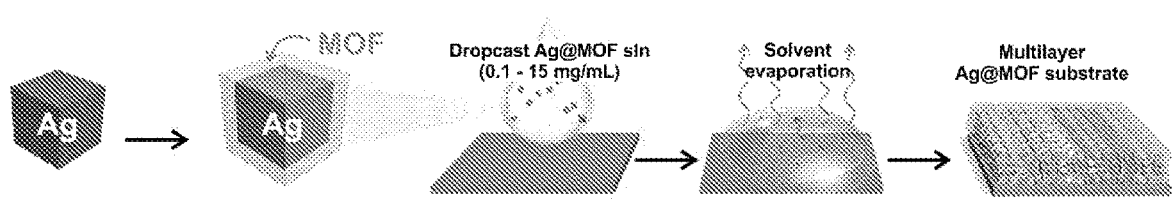

FIG. 6 Schematic illustration of the multilayer substrate fabrication protocol according to Example 1. A core-shell particle (exemplified by Ag@ZIF-8) comprising a core formed from a plasmonic nanoparticle (exemplified by Ag nanocube) and a shell formed from a metal-organic framework (MOF, exemplified by ZIF-8) is prepared according to General Procedure 2. A solution comprising a solvent (exemplified by propanol) and the core-shell particles is dispensed on a substrate (exemplified by Si) and let dry in a controlled manner to form the multilayer substrate.

Figure 7:
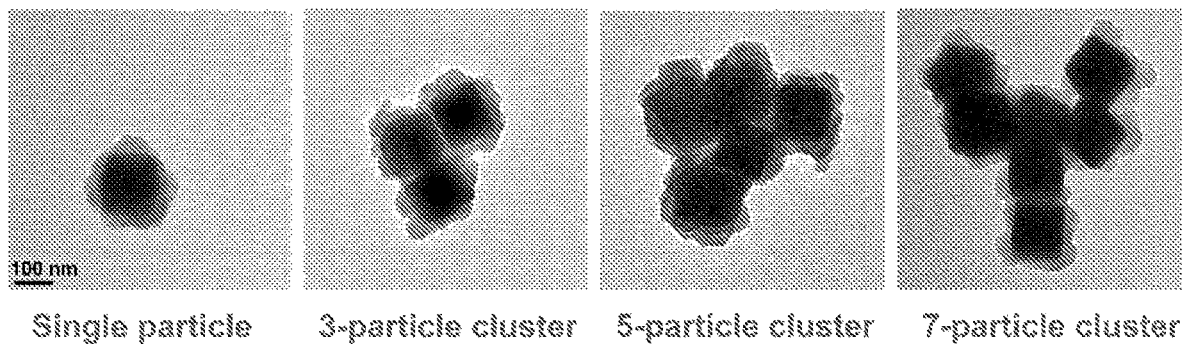

FIG. 7 Transmission electron microscope (TEM) images of a single core-shell Ag@MOF particle, and clusters of multiple Ag particles within a collective MOF shell.

Figure 8:
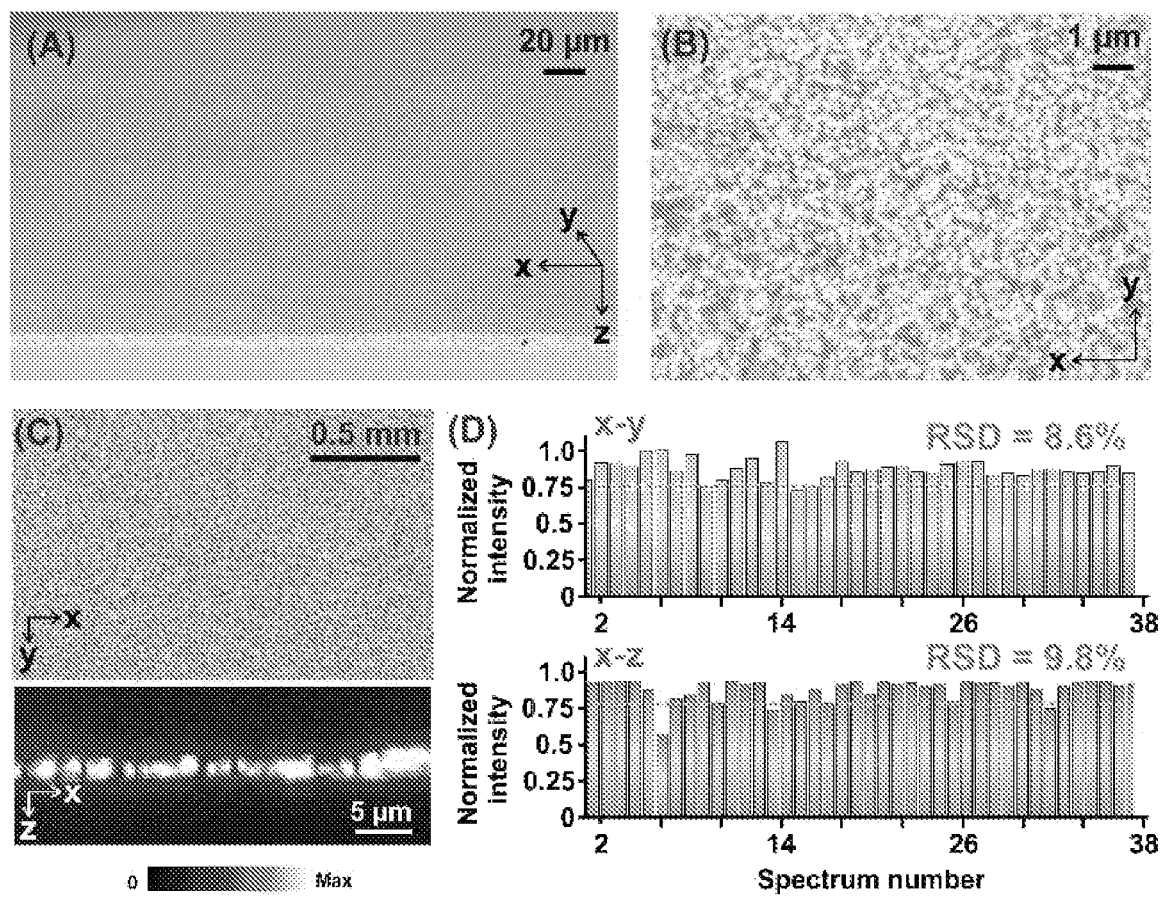

FIG. 8 (A) Tilted 3D SEM image and (B) top view SEM image showing a large area of multilayered Ag@MOF platform. (C) x-y and x-z hyperspectral SERS imaging of Ag@MOF platform over large area (with 4× and 20× objective lens respectively). (D) Intensity profile of 4-MBT signal across random areas in x-y and x-z images showing the homogeneity of the platform.

Figure 9:
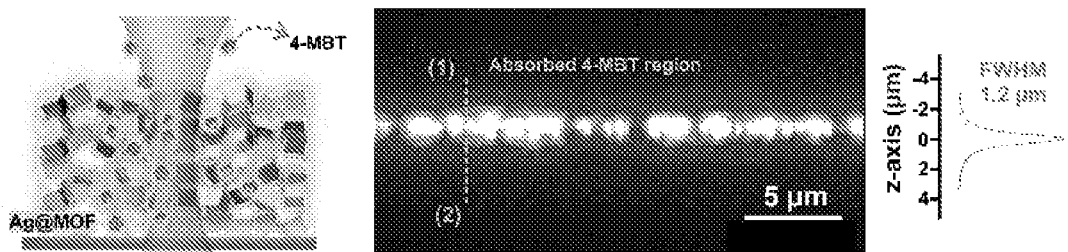
Figure 9:
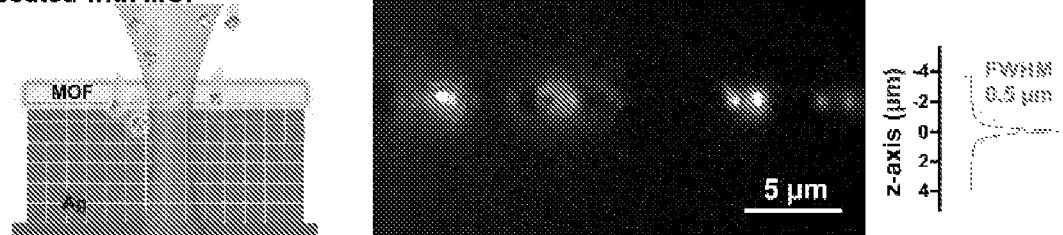
Figure 9:
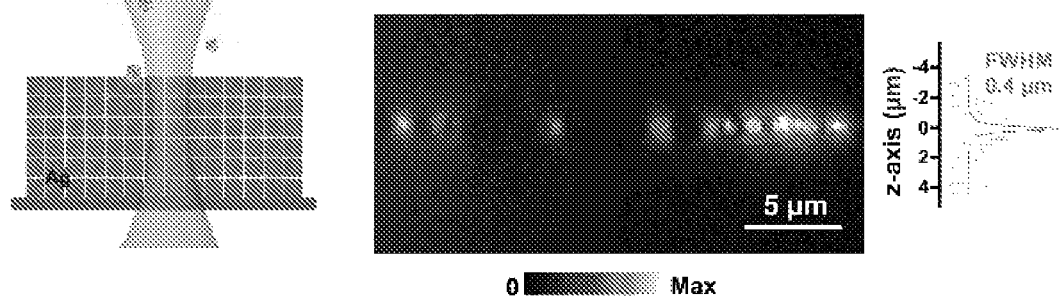
Figure 9:
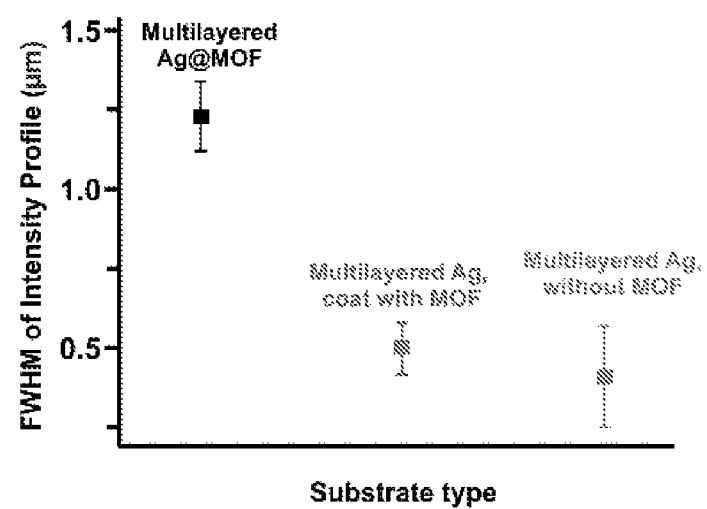

FIG. 9 x-z SERS map of absorbed 4-MBT on different platforms. (A) Scheme and x-y SERS images showing 4-MBT (tracked with 1077 $cm^{-1}$ signal) penetration depth in the 3 platform types. (B) The full-width half-maximum (FWHM) of the obtained x-z intensity profiles.

Figure 10:
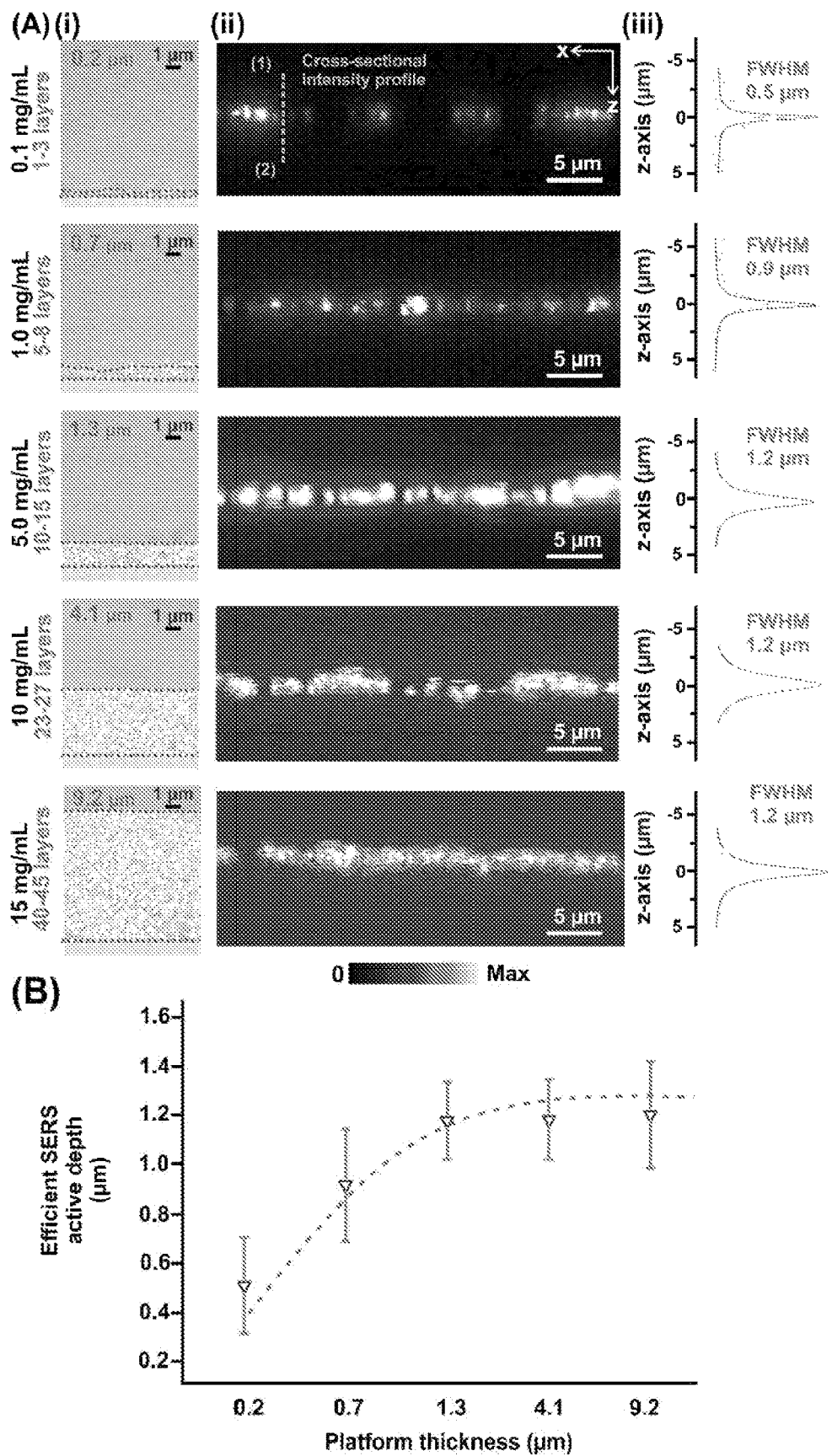

FIG. 10 Efficient SERS-active thickness determined from x-z imaging using confocal lens. (A)(i) Cross-sectional SEM images, (ii) x-z SERS imaging of the multilayer Ag@MOF substrates of different thickness (Ag surface is modified with probe molecule 4-MBT), and (iii) their respective cross-sectional profile tracing 4-MBT 1077 $cm^{-1}$ signal from region (1) to (2). (B) The full-width half-maximum of the intensity profiles, showing the efficient SERS-active thickness, of different multilayer platforms.

Figure 11:
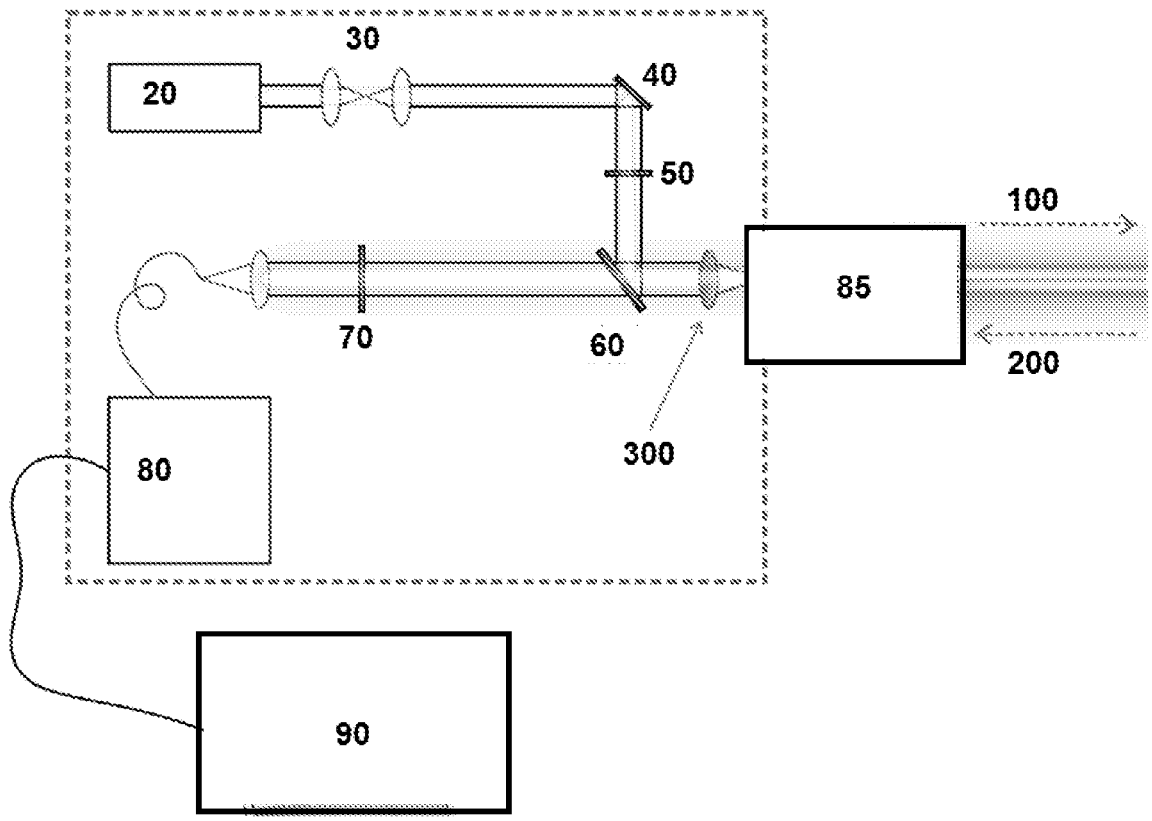

FIG. 11 Schematic showing the optical set-up of the stand-off Raman system with excitation 100 and collection beam 200 aligned in the same path. A portable stand-off Raman spectrophotometer 80 that couples the excitation laser and collection light through the same path via a camera lens 85. 30 represents a beam expander, 40 represents a mirror, 50 represents a narrow bandpass filter, 60 represents a dichoric filter, 70 represents a long-pass filter, 90 represents a computer and 300 represents a focusing lens to focus laser 20 at the back aperture of the camera lens 85.

Figure 12:
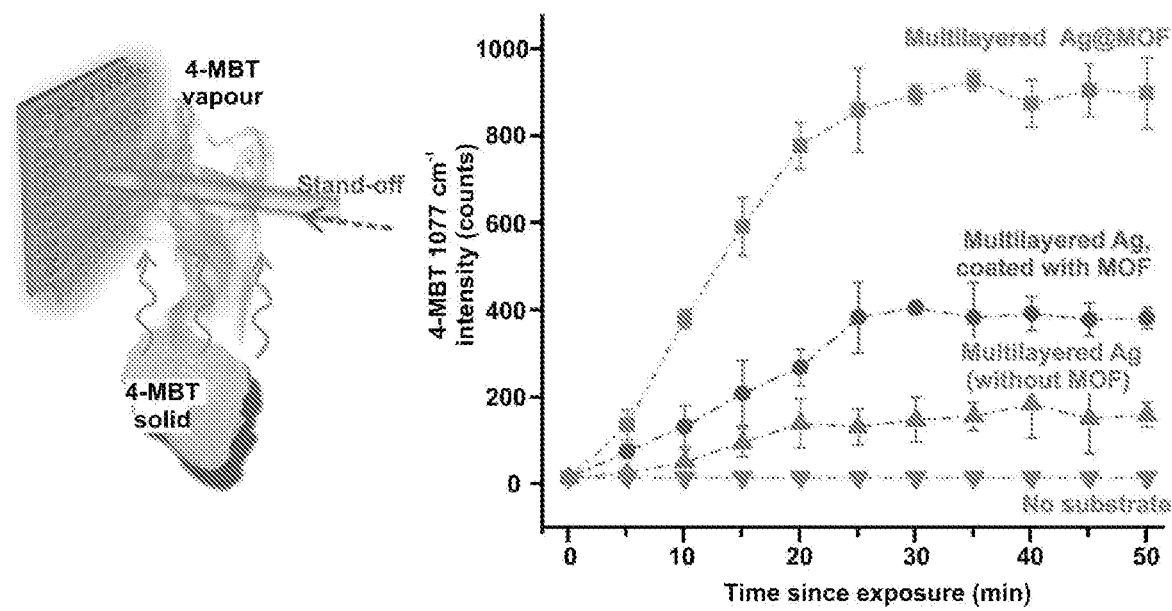

FIG. 12 Absorption of gaseous 4-MBT sublimed from solid. Comparison of 4-MBT intensity obtained in real-time in the 4-MBT vapor detection between different substrates, and without substrate, with a scheme showing the detection of 4-MBT vapor molecules subliming from 4-MBT solid (estimated concentration of 4-MBT~1000 ppm).

Figure 13:
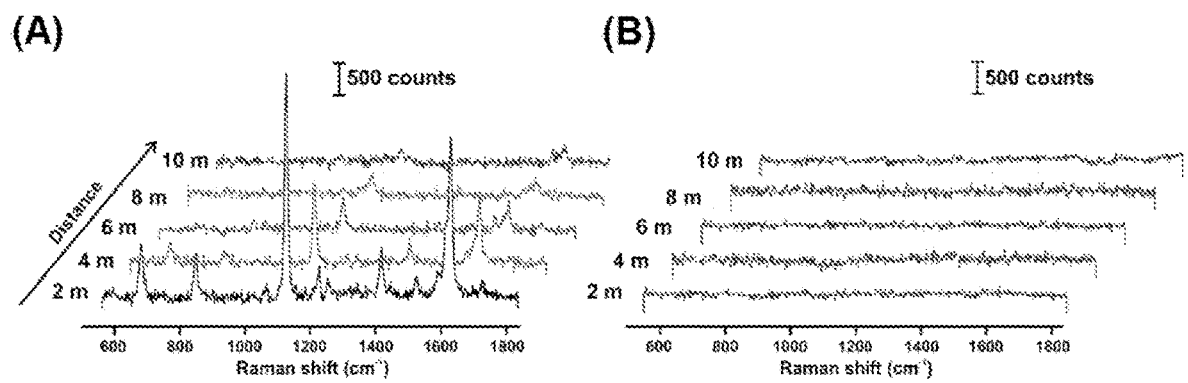

FIG. 13 (A) Stand-off SERS spectra in comparison with (B) stand-off Raman spectra of airborne 4-MBT detected by Ag@MOF platform positioned at different distances relative to the stand-off SERS system.

Figure 14:
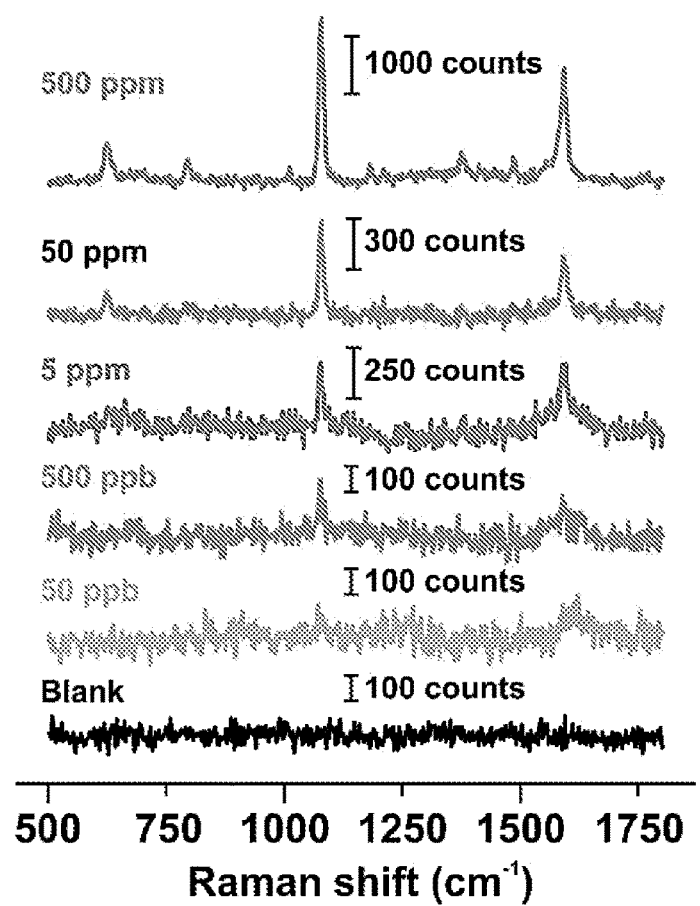

FIG. 14 Quantitative detection of 4-MBT. SERS spectra of airborne 4-MBT at concentrations of from 50 ppb to 500 ppm detected by Ag@MOF platform.

Figure 15:
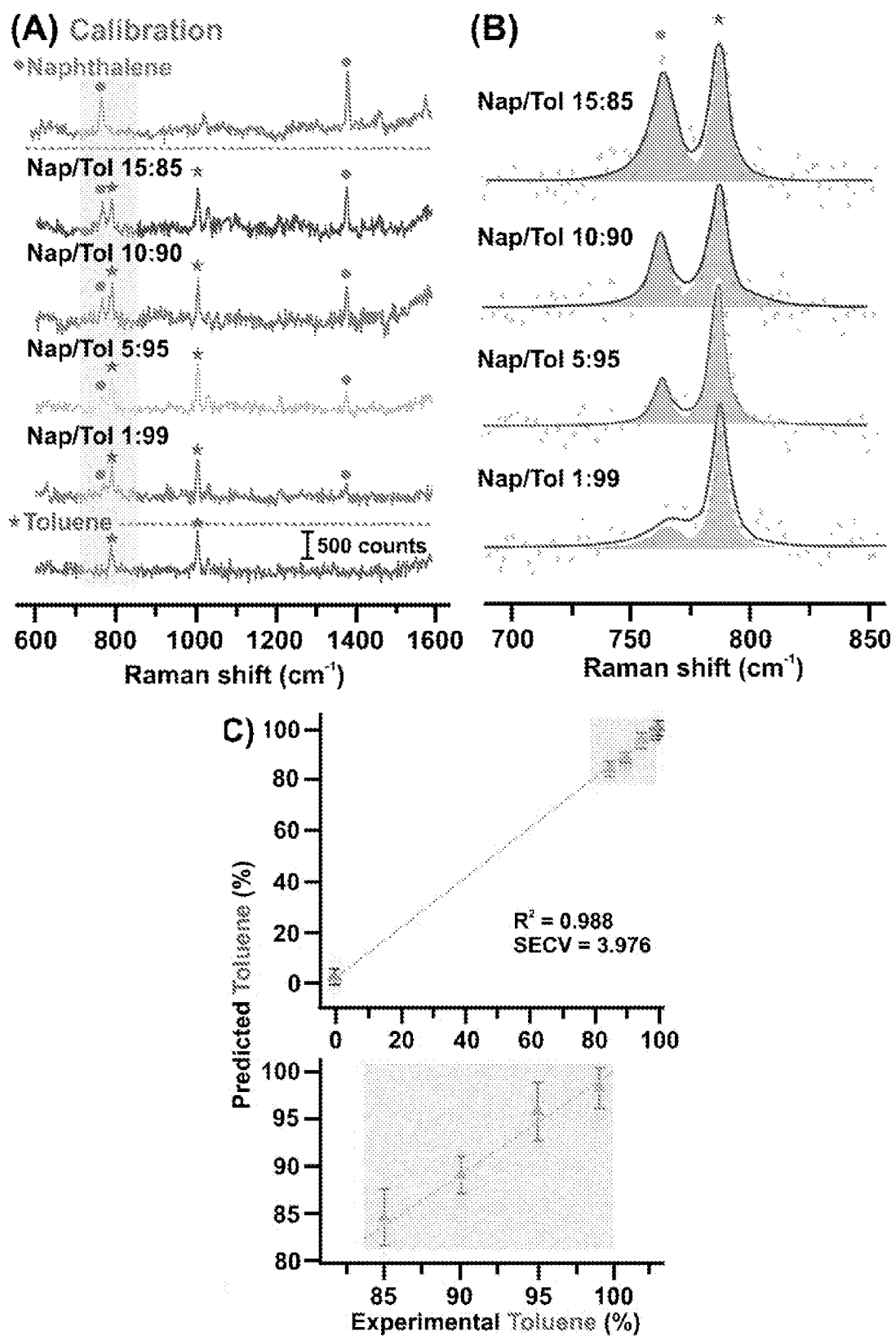

FIG. 15 Calibration of multiplex (poly)aromatic hydrocarbon detection (indoor) (A) Stand-off multiplex SERS spectra obtained with toluene (Tol), naphthalene (Nap) and Nap/Tol mixture at different compositions for calibration (performed indoors, within 100 μL of Tol aerosol, accounting for 7000 μm Tol and 97-1700 ppm of Nap). (B) Spectrum deconvolution of the highlighted area in (A), showing the relative ratio between Nap 763 $cm^{-1}$ and Tol 786 $cm^{-1}$ signals at different compositions. (C) Calibrated PLS prediction model constructed from the SERS spectra of various Nap/Tol composition from 0 to 100% (with a grey-highlighted magnification of Nap/Tol 85 to 99% region).

Figure 16:
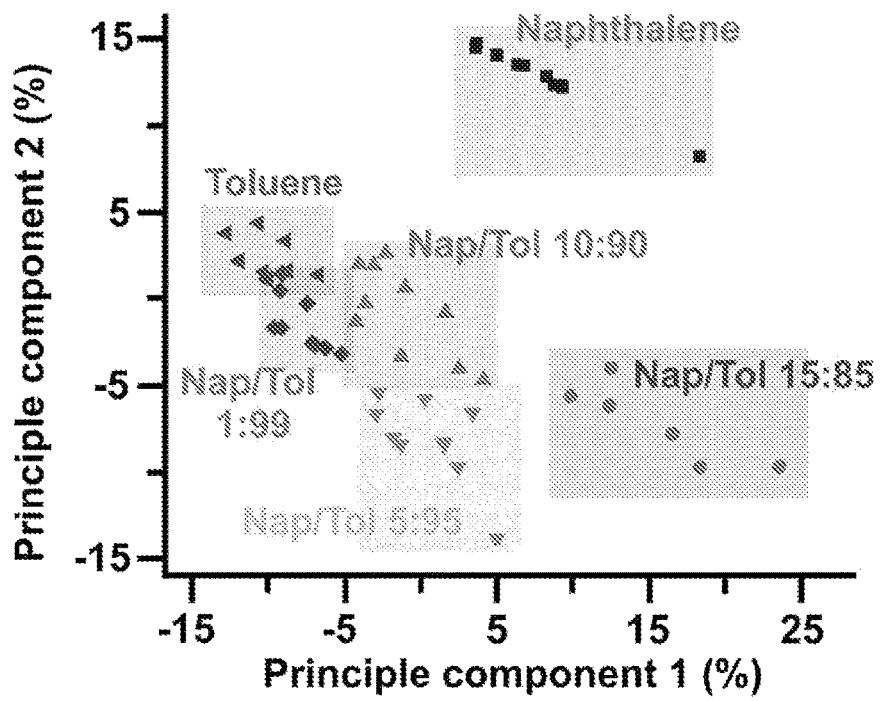

FIG. 16 PCA score plot constructed from the SERS spectra obtained from the detection of Nap/Tol mixture of various composition from Nap/Tol 0/100 to 100/0. The spectra can clearly be differentiated due to the ratio between the vibrational fingerprints of each compound.

Figure 17:
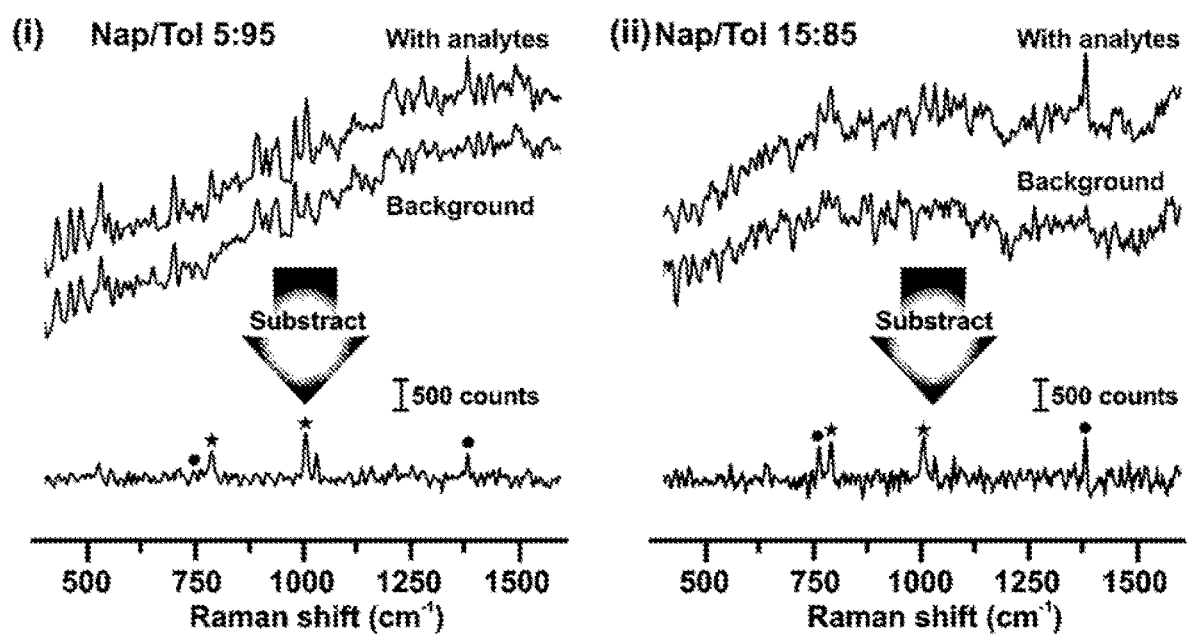

FIG. 17 Background correction and baseline subtraction for SERS spectra obtained in outdoor condition with strong background light interference.

Figure 18:
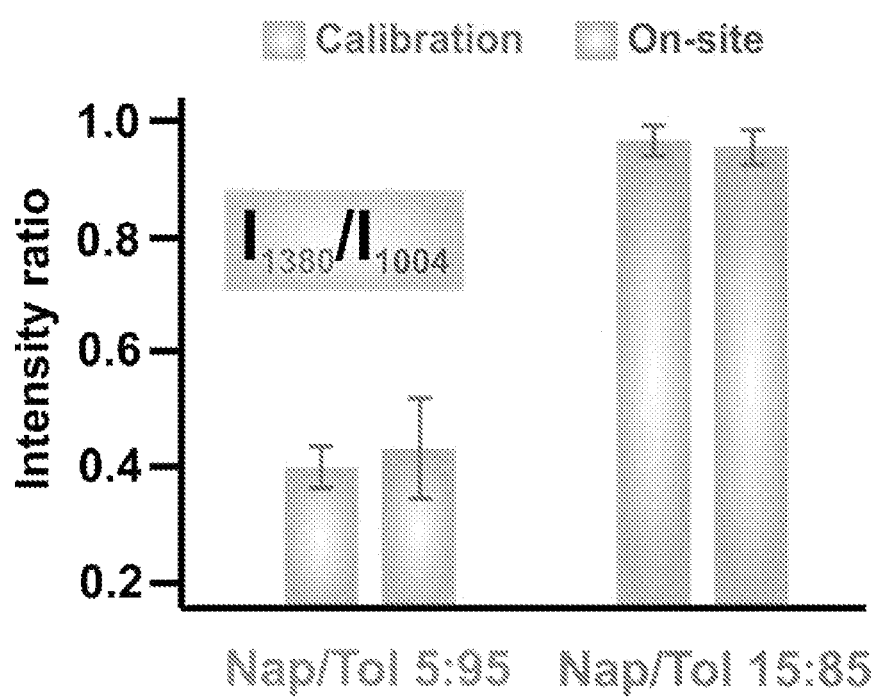

FIG. 18 Comparison of Nap/Tol signal intensity ratio between calibration spectra and outdoor spectra, using the alternative 1380 and 1004 cm$^{-1}$ signals.

DESCRIPTION

Surprisingly, it has been found that many of the problems identified hereinbefore can be solved using layers of nanoparticulate materials. Said materials may simply be a plurality of layer of metal nanoparticles, a plurality of layer of metal nanoparticles covered by a layer of a metal organic framework (MOF) or, more particularly, a plurality of layer of core-shell particles, where the core is a metal nanoparticle and the shell is a MOF.

Thus, in a first aspect of the invention, there is described a composite material suitable for use in surface-enhanced Raman scattering, the material comprising:
a substrate layer having a surface;
a plurality of layers of core-shell particles formed on the surface of the substrate layer, wherein:
the core-shell particles comprise:
a core formed from a plasmonic metal nanoparticle; and
a shell formed from a metal-organic framework; and
the plurality of layers of core-shell particles provides a thickness of from 0.5 to 10 μm on the surface of the substrate layer.

In embodiments herein, the word "comprising" may be interpreted as requiring the features mentioned, but not limiting the presence of other features. Alternatively, the word "comprising" may also relate to the situation where only the components/features listed are intended to be present (e.g. the word "comprising" may be replaced by the phrases "consists of" or "consists essentially of"). It is explicitly contemplated that both the broader and narrower interpretations can be applied to all aspects and embodiments of the present invention. In other words, the word "comprising" and synonyms thereof may be replaced by the phrase "consisting of" or the phrase "consists essentially of" or synonyms thereof and vice versa.

As will be appreciated, any suitable material may be used as the substrate layer. Examples of substrate materials include, but are not limited to an aluminium substrate (e.g. in the form of an aluminium foil or an aluminium plate), a silicon substrate (e.g. a Si (100) substrate), a gallium nitride (GaN) substrate, and a silicon carbide (SiC) substrate. In embodiments that may be mentioned herein, the substrate layer may be formed from a silicon (e.g. a Si (100) substrate layer). A silicon substrate layer may provide a minimal background signal (only a single peak at 520 cm$^{-1}$) and it may be more reflective than other materials, which may boost the SERS signals.

When used herein, "core-shell particle" refers to a material having a core portion formed from a plasmonic metal nanoparticle and a shell portion formed from a metal-organic framework (MOF).

Plasmonic metal nanoparticles are particles whose electron density can couple with the electromagnetic radiation of wavelengths that are far larger than the particle due to the nature of the dielectric-metal interface between the medium and the particles. Examples of plasmonic metal nanoparticles that may be mentioned herein include, but are not limited to plasmonic gold nanoparticles, plasmonic silver nanoparticles, plasmonic platinum nanoparticles, and plasmonic palladium nanoparticles. In particular embodiments of the invention that may be mentioned herein, the plasmonic metal nanoparticles may be plasmonic silver nanoparticles.

The plasmonic metal nanoparticles may have any suitable geometry—provided that said geometry retains the plasmonic effect. Examples of suitable geometries for the plasmonic metal nanoparticles include, but are not limited to nanopolyhedra, nanospheres, nanowires, nanorods, nanobowls, and nanoplates. Said plasmonic metal nanoparticles may be nanoporous. When used herein, the term "nanoporous plasmonic metal nanoparticles" refers to highly porous metallic structures characterized by their three-dimensional networks of nanoscale interconnected ligaments. These interconnected ligaments have curved surfaces dominated by highly active low-coordinated atoms, such as steps and kink.

In particular embodiments that may be mentioned herein, the plasmonic metal nanoparticles may be provided as nanopolyhedra. Said nanopolyhedra may have four or more faces. More particularly, said nanopolyhedra may be selected from one or more nanopolyhedra having from 5 to 30 faces (e.g. from 6 to 26 faces). For example, the nanopolyhedra may be nanocubes or nanooctahedra. In particular embodiments of the invention that may be mentioned herein the nanopolyhedra may be provided as nanocubes. That is, the plasmonic metal nanoparticles may be provided as plasmonic metal nanocubes.

In embodiments where various ranges are discussed, it will be appreciated that any top and bottom range may be combined to provide a further range. For example, concerning the number of faces discussed above, the following ranges are explicitly contemplated:
from 4 to 5 faces, from 4 to 6 faces, from 4 to 26 faces, from 4 to 30 faces;
from 5 to 6 faces, from 5 to 26 faces, from 5 to 30 faces;
from 6 to 26 faces, from 6 to 30 faces; and
from 26 to 30 faces.

Metal organic frameworks (MOFs) are a class of compound that comprise metal ions or clusters thereof coordinated to organic ligands to form one-, two-, or three-dimensional structures. They are a subclass of coordination polymers and they are often porous. Any suitable MOF may be used in the current invention. Examples of suitable MOFs include, but are not limited to one or more of UIO-66, ZIF-8, kag-MOF-1, MFM-300, HKUST-1, SIFSIX-1-Cu, and ZIF-71. As will be appreciated, combinations of MOFs may be used (e.g. 2, 3, or 4 MOFs). In particular embodiments of the invention, the MOF may be ZIF-8.

As noted above, the core-shell particles may be presented as a plurality of layers (e.g. 2, 3, 4, 5 etc) on top of the substrate layer. For example, the core-shell particles may be provided in from 5 to 30 layers (e.g. from 8 to 20 layers, such as from 10 to 15 layers) of core-shell particles on the surface of the substrate layer. The plurality of layers of core-shell particles may provide a thickness of from 0.8 to 5 μm (e.g. from 1 to 2 μm) on the surface of the substrate layer. The thickness of the plurality of layers of core-shell particles can be adjusted accordingly to the collection depth of the stand-off laser used. In particular, embodiments that may be mentioned herein the plurality of layers of core-shell particles may provide a thickness of at least 1.3 μm on the surface of the substrate layer. For example, the plurality of layers of core-shell particles may provide a thickness of about 1.3 μm on the surface of the substrate layer.

When used herein, the term "about" in connection with a numerical value may refer to a variance of from ±20%, such as ±10%, such as ±5%, such as ±2%, such as ±1%.

The core-shell particles in the plurality of layers may be arranged in any suitable manner in said layers. For example, the core-shell particles in the plurality of layers may be packed with an interparticle distance of less than 10 nm, such as from 0.1 to 9.8 nm. Without wishing to be bound by theory, it is believed that a close-packed arrangement may allow an intense plasmonic coupling that forms SERS hotspots.

The core-shell particles may have any suitable size (e.g. diameter). For example, the core-shell particles may have a size of from 100 nm to 1,000 nm, such as from 200 to 600 nm, such as from 300 to 500 nm. The shell layer of the core-shell particles (i.e. the layer formed by the MOF) may have any suitable thickness over the core plasmonic metal nanoparticle. For example, the shell layer may have a thickness of from 5 nm to 100 nm, such as from 10 to 80 nm in the core-shell particles described herein.

In certain embodiments of the invention that may be disclosed herein, before the plasmonic metal nanoparticle is coated with the MOF, it may be reacted with 4-methylbenzene thiol. As such the 4-methylbenzene thiol ends up bound (i.e. covalently bonded) to the surface of the plasmonic metal nanoparticle.

The 4-methylbenzene thiol may act as an internal standard.

In examples of the first aspect of the invention that may be mentioned herein, the composite material of the first aspect of the invention may have one or more of the following features:
(ai) the plasmonic metal nanoparticles may be silver nanocubes; and/or
(aii) the metal organic framework may be selected from one of the group consisting of UIO-66, ZIF-8, kag-MOF-1, MFM-300, HKUST-1, SIFSIX-1-Cu, and ZIF-71; and/or
(aiii) the plurality of layers of core-shell particles may provide a thickness of about 1.3 μm on the surface of the substrate layer; and/or
(aiv) the plurality of layers of core-shell particles may provide from 10 to 15 layers of core-shell particles on the surface of the substrate layer.

In a particular embodiment of the first aspect of the invention that may be mentioned herein, the composite material may be one where:
(Ai) the plasmonic metal nanoparticles are silver nanocubes; and
(Aii) the metal organic framework is selected from one of the group consisting of UIO-66, ZIF-8, kag-MOF-1, MFM-300, HKUST-1, SIFSIX-1-Cu, and ZIF-71; and
(Aiii) the plurality of layers of core-shell particles provide a thickness of about 1.3 μm on the surface of the substrate layer; and
(Aiv) the plurality of layers of core-shell particles provide from 10 to 15 layers of core-shell particles on the surface of the substrate layer.

For example the composite material of the first aspect of the invention may be one in which:
the plasmonic metal nanoparticles are silver nanocubes;
the metal organic framework is ZIF-8; and
the plurality of layers of core-shell particles are provided in from 10 to 15 layers and provide a thickness of about 1.3 μm. In certain embodiments, a surface of the silver nanocubes may be bonded to 4-methylbenzene thiol.

A second aspect of the current invention relates to the formation of the composite material described above in the first aspect of the invention. Thus, in a second aspect of the invention, there is described a method of forming a composite material as described above, which method comprises:
(ci) providing a substrate having a surface and a solution comprising a solvent and core-shell particles comprising:
a core formed from a plasmonic metal nanoparticle; and
a shell formed from a metal-organic framework; and
(cii) placing a portion of the solution onto the surface of the substrate and allowing the solvent to evaporate to provide the composite material. Any suitable solvent may be used in the solution to form the composite material. For example, the solvent may be an organic alcohol, such as, an organic alcohol that has three or more carbon atoms, where the carbon atoms may be presented in a linear chain or branched. In particular embodiments of the invention that may be mentioned herein, the organic alcohol may be a mono-ol that has a boiling point of from 80° C. to 120° C., such as a boiling point between 90° C. and 100° C. Without wishing to be bound by theory, it is believed that the homogeneity in platform thickness and close-pack arrangement of particles are achieved by controlled slow drying with the selected solvent (e.g. an organic alcohol, such as a mono-ol that has a boiling point of from 80° C. to 120° C.). An example of a suitable organic alcohol that may be used in this method is 1-propanol.

In an example of the process, the concentration of the core-shell particles in the solution may be from 0.5 to 20 mg/mL and the substrate may have a surface area of from 0.5×0.5 cm. As will be appreciated, as the surface area of the substrate is changed (up or down), the concentration of the core-shell particles in the solution may be adapted to provide the desired properties for the resulting composite material. Said changes will be readily accomplished by the skilled person using simple trial and error and/or their own general knowledge of this field.

The method described above may allow the formation of a composite material (for e.g. a 3D plasmonic SERS platform) that is homogeneous in thickness over a large area (mm scale). These characteristics may make it easier when using stand-off conditions to align the composite material with the laser, as well as providing improved reproducibility of the results obtained. This is because it is difficult to reproducibly ensure that a laser hits a very small target area on a composite material from the distance used under stand-off conditions. The ease of alignment and reproducibility of results are demonstrated by Example 1 and FIG. 10. The described method may also provide a composite material having a close-packed arrangement. For example, the formation of Ag@ZIF particles where the Ag particles are packed within interparticle distance <10 nm, may allow intense plasmonic coupling that forms SERS hotspots (and hence provides strong SERS signals). As noted above, the solvent may be an organic alcohol, such as a mono-ol that has a boiling point of from 80° C. to 120° C. In an embodiment of the method that may be mentioned herein, the solvent may be 1-propanol. As noted above more generically for organic mono-ols that have a boiling point of from 80° C. to 120° C., it is believed that the homogeneity in platform thickness and close-pack arrangement of particles are achieved by controlled slow drying with the solvent 1-propanol.

In a third aspect of the invention, there is provided an alternative composite material. Thus, there is provided a composite material suitable for use in surface-enhanced Raman scattering, the material comprising:
a substrate layer having a surface;
a plurality of layers of plasmonic metal nanoparticles formed on the surface of the substrate layer, wherein:
the plurality of layers of plasmonic metal nanoparticles provide a thickness of from 0.3 to 10 µm on the surface of the substrate layer.

Unless otherwise stated, the definitions used hereinbefore also apply to this aspect of the invention and so will be omitted for brevity. For example, the plasmonic metal nanoparticles in this aspect may be selected from the plasmonic metal nanoparticles discussed above, which are used to form the core of the core-shell particles in the first aspect of the invention. For example, the plasmonic metal nanoparticles may have any suitable size (e.g. edge length), such as a size of from 100 nm to 1,000 nm, such as from 150 to 500 nm, such as from 170 to 250 nm. The plasmonic metal nanoparticles may be "naked" metal nanoparticles, or they may be bonded to 4-methylbenzene thiol, which may act as an internal standard.

In certain embodiments, the plurality of layers of plasmonic metal nanoparticles alone may provide a thickness of from 0.4 to 1.5 µm, such as from 0.5 to 1 µm, on the surface of the substrate layer.

In certain embodiments of the third aspect of the invention, the composite material may further comprise a layer of a metal-organic framework, which is formed on a surface provided by the plurality of layers of plasmonic metal nanoparticles. Similarly, the MOF used as an independent layer may simply be selected from the MOFs disclosed above in respect of the first aspect of the invention, as may the substrate layer. In such embodiments, the total thickness of the plurality of layers of plasmonic metal nanoparticles and the layer of a metal-organic framework may be from 0.4 to 10 µm (e.g. from 0.4 to 1.5 µm, such as from 0.5 to 1 µm) on the surface of the substrate layer.

As noted above, the plasmonic metal nanoparticles may be presented as a plurality of layers (e.g. 2, 3, 4, 5 etc) on top of the substrate layer. For example, the plasmonic metal nanoparticles may be provided in from 5 to 30 layers (e.g. from 8 to 20 layers, such as from 10 to 15 layers) of plasmonic metal nanoparticles on the surface of the substrate layer.

The layer of a metal organic framework that is laid on top of the plurality of layers of plasmonic metal nanoparticles may have any suitable thickness. Suitable thickness for the MOF layer that may be mentioned herein include, but are not limited to a thickness of from 50 nm to 500 nm, such as from 100 to 300 nm, such as 200 nm.

In examples of the third aspect of the invention that may be mentioned herein, the composite material may have one or more of the following features:
(di) the plasmonic metal nanoparticles may be silver nanocubes; and/or
(dii) when present, the metal organic framework may be selected from one of the group consisting of UIO-66, ZIF-8, kag-MOF-1, MFM-300, HKUST-1, SIFSIX-1-Cu, and ZIF-71; and/or
(diii) the plurality of layers of plasmonic metal nanoparticles provide from 10 to 15 layers of plasmonic metal nanoparticles on the surface of the substrate layer.

In a particular embodiment of the third aspect of the invention that may be mentioned herein, the composite material may be one where:
(Di) the plasmonic metal nanoparticles are silver nanocubes;
(Dii) when present, the metal organic framework is selected from one of the group consisting of UIO-66, ZIF-8, kag-MOF-1, MFM-300, HKUST-1, SIFSIX-1-Cu, and ZIF-71; and
(Diii) the plurality of layers of plasmonic metal nanoparticles provide from 10 to 15 layers of plasmonic metal nanoparticles on the surface of the substrate layer.

For example the composite material of the third aspect of the invention may be one in which:
the plasmonic metal nanoparticles are silver nanocubes;
the metal organic framework is ZIF-8;
the plurality of layers of silver nanocubes are provided in from 10 to 15 layers, optionally wherein a surface of the silver nanocubes are bonded to 4-methylbenzene thiol.

A fourth aspect of the current invention relates to the formation of the composite material described above in the third aspect of the invention. This relates to embodiments of the invention where the MOF does not form a coating layer on top of the plurality of layers of plasmonic metal nanoparticles. Thus, there is provided a method of forming a composite material according to the third aspect of the invention where a layer of MOF is not present (and any technically sensible combination of its embodiments), which method comprises:
(ei) providing a substrate having a surface and a solution comprising a solvent and plasmonic metal nanoparticles; and
(eii) placing a portion of the solution onto the surface of the substrate and allowing the solvent to evaporate to provide the composite material. Any suitable solvent may be used in the solution to form the composite material. For example, the solvent may be an organic alcohol, such as, an organic alcohol that has three or more carbon atoms, where the carbon atoms may be presented in a linear chain or branched. In particular embodiments of the invention that may be mentioned herein, the organic alcohol may be a mono-ol that has a boiling point of from 80° C. to 120° C., such as a boiling point between 90° C. and 100° C. An example of a suitable organic alcohol that may be used in this method is 1-propanol.

A fifth aspect of the current invention relates to the formation of the composite material described above in the third aspect of the invention. This relates to embodiments of the invention where a MOF forms a coating layer on top of the plurality of layers of plasmonic metal nanoparticles. Thus, there is provided a method of forming a composite material according to the third aspect of the invention where a layer of MOF is present (and any technically sensible combination of its embodiments), which method comprises:
(fi) placing a substrate coated with a plurality of layers of plasmonic metal nanoparticles into a solution comprising a solvent, a metal organic framework metal salt precursor and a metal organic framework organic precursor compound to form an intermediate material;
(fii) removing the intermediate material from the solution, washing and drying it; and
(fii) repeating step (fi) and (fii) from 0 to 5 times with the intermediate material to form the composite material. Any suitable solvent may be used in the solution used in this method. For example, the solvent may be an organic alcohol, such as methanol.

The substrate coated with a plurality of layers of plasmonic metal nanoparticles may be obtained by use of the method described in the fourth aspect of the invention.

As will be appreciated, the composite materials disclosed above may be used in the detection of a gas or a volatile organic chemical (VOC). As such, in a sixth aspect of the invention, there is disclosed a kit of parts comprising:
- (bi) a composite material as described in the first and third aspect of the invention (and any technically sensible combination of their embodiments); and
- (bii) an excitation and detection means or apparatus.

Any suitable excitation and detection means or apparatus may be used. For example, the excitation and detection means or apparatus may comprise a spectrophotometer, a laser and a lens.

While not necessary, the kit of parts may also include a target housing for the composite material. Said target housing may help to reduce environmental factors that may affect a reading obtained from the device (e.g. reducing the influence of wind and background light etc. on the reading).

As intimated above, the composite materials disclosed herein may be particularly suitable for use in the detection of gasses and volatile organic compounds. Thus, in a seventh aspect of the invention, there is provided a method of detecting one or more of a gas and a volatile organic chemical, the method comprising the steps of:
- (i) placing a composite material as described in the first or third aspects of the invention (and any technically sensible combination of their embodiments) at a target site for a period of time;
- (ii) using an excitation and detection means or apparatus to provide an excitation signal to the composite material at the target site; and
- (iii) detecting a surface-enhanced Raman scattering signal produced by the excitation signal in the composite material at the target site and determining whether the one or more of a gas and a volatile organic compound is present in the composite material, wherein
  - the detection means or apparatus is set at a distance of from 1 to 20 metres away from the composite material at the target site.

The target site may simply be a volume of space immediately surrounding the composite material. Alternatively, it may refer to a space defined by a target housing, which contains the composite material. Any suitable size or shape can be used for the target housing, if it is present, though it may conveniently be an open-box shape.

The detection means or apparatus may be set at any suitable distance from the target site. For example, the detection means or apparatus may be set at a distance of from 2 to 10 metres away from the composite material at the target site. The described method hence allows remote detection or stand-off detection of chemicals without close contact with the target. This is valuable for applications such as low-profile monitoring, civil defense and environmental control.

The composite materials described herein may be useful in detecting one or more of CO, $CO_2$, $H_2S$, $SO_x$, and small volatile organic compounds selected from one or more of the group consisting of aromatic hydrocarbons, and aliphatic compounds having up to 10 carbon atoms in a linear chain. For example, the composite materials described herein may be useful in detecting one or more of $CO_2$, $H_2S$, $SO_2$, and small volatile organic compounds selected from one or more of the group consisting of xylene, 4-methylbenzenethiol, toluene, and naphthalene (e.g. 4-methylbenzenethiol, toluene, and naphthalene).

The detection method may make use of any composite material described hereinbefore.

The composite material as described herein may provide a multi-layered SERS platform that possesses micron-scale large hotspot depth and good analyte-sorbing ability. As demonstrated in Example 4, the composite material may be a Ag@MOF platform that is coupled with a stand-off Raman system for remote detection of airborne species, with sensitivity at parts-per-billion (ppb) level at 2-10 meters away. The Ag@MOF platform displays superior sensitivity and response time in the detection of airborne chemicals over other Ag-MOF configurations, as illustrated in Examples 2 and 4. In addition, the Ag@MOF platform demonstrates remote air monitoring applications, as it is able to rapidly track chemical changes in atmospheric content when $CO_2$ and $N_2$ gases are exposed to the platform in repeated cycles (see Example 5). Notably, as shown in Example 6, the Ag@MOF platform achieves real-time and remote multiplex quantification of polycyclic aromatic hydrocarbons (PAH) mixtures even in strong outdoor daylight background and ambient air.

Further advantages associated with the described composite materials over existing methods, devices or materials are described below. The advantages may also be associated with the kit of parts comprising the composite material as described herein.

The composite materials disclosed herein may not require a high laser power to retrieve Raman fingerprints from remote distances (e.g. 2-10 meters). As demonstrated in Example 4 below, the Ag@MOF platform requires only <55 mW of laser power instead of >400 mW in remote Raman analysis and detection. This reduces the risks of damaging the operator's eyes and skin.

The composite materials disclosed herein are able to retrieve molecule fingerprints of highly dispersed airborne chemicals in both gaseous and aerosolized form, which features a huge advancement over normal remote Raman spectroscopy that mainly detects pure solids and liquids.

As mentioned hereinbefore, the composite materials disclosed herein may possesses micron-scale large hotspot depth and good analyte-sorbing ability. Current 2D nanometer-scale SERS substrates have low hotspot volume which makes them unusable for stand-off SERS sensing of airborne molecules. Indeed, a typical stand-off Raman system with a large focal depth (mm to cm) is often underutilized due to the shortage of plasmonic hotspots along the z-direction of common nanometer-thick 2D SERS platforms, which are designed for microscopic systems with sub-micrometer resolution. Such an inefficient utilization of stand-off laser excitation volume will lead to poor signal read-out due to the signal contribution from ambient interference present in the laser volume.

When present in the composite material, the embedded molecular-sorbing MOF layer may provide active and efficient sorption of airborne species in the ambient environment, allowing their rapid identification within ≤10 seconds. This is a significant improvement over conventional molecule collection methods using electrodeposition or an ultralow temperature (e.g. −80° C.).

A commercial application of the described composite material is in forming a miniaturized remote SERS sensor for continuous real-time atmospheric monitoring, including detection of airborne toxins, biohazards, leaked gases or explosives with specific fingerprints. Detection can occur within a few seconds to a few minutes upon the introduction of foreign gaseous molecules, which is much faster than conventional gas sensors. Therefore, potential disasters can be detected early and prompt preventive actions can be taken. The remote SERS detection system can be widely applicable in multiple enclosed or open facilities, including train stations, airports or even forests and seaside areas.

While the composite materials disclosed in the examples below make use of Ag nanocubes, with or without ZIF-8, it will be appreciated that other configurations may be used. Whether that is a plurality of layers of metal nanoparticles alone (using any of the metals disclosed herein), a combination of a plurality of layers of metal nanoparticles topped by a layer of a MOF or, more particularly, a plurality of layers of core-shell particles that have a metal nanoparticle core and a MOF shell. For example, the MOF material may be selected based on the desired application and target analyte. As will be appreciated by a skilled person, some MOFs have a higher selectivity to certain gasses over others. The MOF may also act as a filter membrane to extract the target gases. Examples of such MOFs and analytes are listed in Table 1.

TABLE 1

MOFs' selectivity towards gaseous analytes

| Metal-organic-framework (MOF) | More selective towards | Reference |
|---|---|---|
| ZIF-8 | $CO_2$, small VOCs < 10-carbon chains, mono-/bi-cylic aromatic hydrocarbons | ACS Nano 2019, 13, 10, 12090-12099 |
| kag-MOF-1 | $CO_2$, $H_2S$ | Chem. 2017, 2(1), 52-80 |
| MFM-300 | $SO_2$ | J. Mater. Chem. A, 2018, 6, 5550 |
| HKUST-1 | Xylene | Anal. Chem. 2016, 88, 24, 12234-12240 |
| SIFSIX-1-Cu | $SO_2$ | Adv. Mater. 2017, 29, 1606929 |

Further aspects and embodiments of the invention will now be described by reference to the following non-limiting examples.

EXAMPLES

Chemicals

Silver nitrate (≥99%), anhydrous 1,5-pentanediol (PD, ≥97%), poly(vinylpyrrolidone) (PVP, average MW=55,000), decane (≥98%), zinc nitrate hexahydrate (reagent grade, 98%), 2-methylimidazole (99%), 1H,1H,2H,2H-perfluorodecanethiol (PFDT; 97%), Methylbenzenethiol (4-MBT, 98%), naphthalene (99%), 1-propanol (anhydrous, 99.7%) were purchased from Sigma Aldrich; copper (II) chloride (≥98%) was from Alfa Aesar; methanol (ACS reagent, ≥99.8%) was from J.T.Baker®; ethanol (ACS, ISO, Reag. Ph Eur) and ammonia (ACS, Reag. Ph Eur) was from EMSURE®; dimethylformamide (HPLC grade) was obtained from Fisher Scientific; nitrogen ($N_2$; ALPHAGAZ 1; 99.999%) and carbon dioxide ($CO_2$; ALPHAGAZ 1; 99.99%) were purchased from Singapore Oxygen Air Liquide Pte Ltd. All chemicals were applied without further purification. Milli-Q water (>18.0 MΩ·cm) was purified with a Sartorius Arium® 611 UV ultrapure water system.
General Procedure 1: Synthesis, Purification and Characterisation of Aq Nanocubes The preparation of silver (Ag) nanocubes were carried out according to the polyol method described in literature (Angewandte Chemie International Edition 2014, 53 (20), 5054-5058). Briefly, 10 mL each of copper (II) chloride (8 mg/mL), poly(vinylpyrrolidone) (20 mg/mL) and silver nitrate (20 mg/mL) were separately dissolved in 1,5-pentanediol. The chemicals were sonicated and vortexed repeatedly to dissolve them. 35 μL copper (II) chloride solution was then added to the silver nitrate solution. Then, 20 mL of 1,5-pentanediol in a 100 mL round bottomed flask was heated to 190° C. for 10 min. 250 μL poly(vinylpyrrolidone) precursor was added to flask dropwise every 30 s while 500 μL silver nitrate precursor was injected every minute using a quick addition. The addition process continued until the greenish coloration of the reaction mixture faded off.

For the purification of Ag nanocubes, 1,5-pentanediol was first removed from the mixture through centrifugation. The Ag nanocubes solution was then dispersed in 10 mL ethanol and 100 mL aqueous poly(vinylpyrrolidone) solution (0.2 g/L). The resulting solution was vacuum filtered using Durapore® polyvinylidene fluoride filter membranes (Millipore) with pore sizes ranging from 5000 nm, 650 nm, 450 nm and 220 nm, repeated several times for each pore size. The Ag nanocubes were then redispersed in ethanol (~5 mg/mL) and stored in fridge.

The as-synthesized Ag nanocubes and their size distribution were characterized by SEM (FIG. 5). The nanocubes have an edge length of 121±5 nm, which provides strong SERS enhancement arising from their sharp tips and edges.
4-Methylbenzenethiol (4-MBT) Functionalization of Ag Nanocubes The removal of the surfactant (such as poly(vinylpyrrolidone) from Ag nanocubes surface was done by functionalizing the as-synthesized Ag nanocubes with 4-MBT. The as-synthesized Ag nanocubes (as prepared from General Procedure 1) were immersed in 5 mM of 4-MBT methanolic solution for at least 3 hours.
HCl Treatment of Ag Nanocubes The removal of surfactant (such as poly(vinylpyrrolidone) from Ag nanocubes surface was carried out in accordance with method described in literature (Anal. Chem. 2011, 83 (11), 4178-4183). This is to provide a featureless SERS background in the region of 600 to 1700 cm$^{-1}$ which is necessary for accurate analyte detection. 100 μL of purified Ag nanocubes in ethanol suspension (10 mg/mL; as prepared in General Procedure 1 was added to 5 mL hydrochloric acid (0.01 M) in water with stirring. After 3 h, the Ag nanocubes colloidal suspension was then washed with copious amount of pure water and ethanol to remove excess HCl. The HCl-treated Ag nanocubes were subsequently re-dispersed in ethanol for further use.

Either 4-MBT functionalization or HCl treatment can remove the surfactants. Nonetheless, 4-MBT functionalization will form a layer of 4-MBT probe on the surface. This is for characterization or detection experiment that needs 4-MBT signals as 'internal' standards to base on. HCl treatment will only remove the surfactant and leave a clean surface. This is for experiments where 'internal' 4-MBT signals is not required, such as the detection of 4-MBT, or toluene and naphthalene from the external environment.
General Procedure 2: Synthesis of Ag@MOF Particles (Ag@ZIF Core-Shell)

Using a ZIF overgrowth method, polycrystalline Ag@MOF particles with a continuous ZIF coating at a thickness of 44±5 nm were synthesized. 250 μL of Zn(NO$_3$)$_2$ (25 mM) was added to a vial of 1.3 mL methanol and stirred at 500 rpm for 5 minutes. 250 μL of methanolic 2-methylimidazole (50 mM) was then added, followed by the immediate addition of 200 μL Ag nanocubes solution (4.7 mg/mL, Ag nanocubes were prepared in accordance with General Procedure 1 and can be functionalized with 4-MBT to provide an internal standard, or HCl-treated to remove surface groups). The mixture was stirred for another 90 minutes at 500 rpm. Excess reagents were removed by centrifugation and the core-shell particles were then washed twice with methanol and then finally re-dispersed in methanol. Methanol is the preferred solvent for storing the core-shell particles. Shortly before preparing the multilayer platform (as describe in Example 1), the core-shell particles were transferred to 1-propanol by centrifugation and sonication The as-obtained core-shell particles were characterized by SEM (FIG. 1A(i) and (ii)), TEM (FIG. 7) and 3D x-y-z SERS (FIG. 1A(iii)). The TEM images indicate that the Ag cubes form close-packed structures that allows tip-to-tip and edge-to-edge plasmonic coupling, despite the MOF coating on each individual Ag@MOF particle.

Activation of Substrates

All MOF-modified substrates were thermally activated to remove any solvent molecules within its pores by heating the substrate under vacuum at 120° C. for 2 hours. The substrates were used immediately after activation for the detection experiments described below.

The activation step is intended to withdraw existing molecules in the SERS platform including pores of MOF so that the SERS platform may "host" and detect new "guest" molecules. The temperature should not exceed 140° C. because MOF materials may degrade at temperatures above 140° C.

Preparation of 3D-Printed Chamber 3D models were designed in AutoDesk 3Ds Max 2016, and exported to and printed with FormLabs 1+3D printer using clear resins FL02. The chamber was designed such that the airborne analyte can be sprayed into from top down. The chamber interior and the laser source (objective lens) is separated with a quartz slide to limit chemical dispersion in lab-based experiments. For Example 6 (outdoor experiments), the quartz slide is removed to minimize loss of laser power and signal intensity.

General Methods

Scanning electron microscope (SEM) imaging was performed using JEOL-JSM-7600F microscope. SEM images of Ag@MOF particles are overlapping images of two sets of images with the same magnification, taken with (1) secondary electron imaging (SEI) mode which reveals the MOF coating, and (2) low-angle backscattered electrons (LABE) mode which reveals the Ag core, to fully visualize the core-shell structure in 3D. Tilted SEM image was performed at 10° tilt angle (FIG. 1A(ii)). Transmission electron microscope (TEM) imaging was performed using JEOL-2100 at an accelerating voltage of 200 kV. UV-vis spectra were measured with Cary 60 UV-vis spectrometer. Substrate X-ray diffraction patterns were recorded on a Bruker GADDS XRD diffractometer with Cu Kα radiation. Stand-off SERS was performed on a portable stand-off Raman spectrophotometer with a mounted 200 mm Nikon lens, at ≤55 mW laser power, 532 nm wavelength, 1 mm×1 mm×3.9 mm laser volume (Technospex Pte. Ltd, Singapore). Hyperspectral SERS imaging were performed using x-y, x-z and x-y-z hyperspectral imaging mode of the Ramantouch microspectrometer (Nanophoton Inc., Osaka, Japan) with an excitation wavelength of 532 nm and laser power of 0.06 mW. A 100× objective lens (N.A 0.90), 20× objective lens (N.A 0.45) and a 4× objective lens (N.A 0.13, for large scale imaging) with 1 s acquisition time was used for data collection. For x-y-z image, original data was obtained over 400 horizontal pixels and cropped to ~150 horizontal pixels. Determining the Laser Focal Depth of Stand-Off Instruments A substrate of 100 nm fluorescent microspheres is positioned at 2 meters from the stand-off instruments, the substrate was then moved along the z-axis forward and backward a few centimeters from the original position. The full-width half-maximum (FWHM) of the intensity profile was then obtained.

Example 1. Assembly and Characterization of 3D Ag@MOF SERS Platform Formed by Assembling Ag@MOF Nanocubes into Multilayered Substrates (Substrate 1/Ag@MOF Substrate)

The 3D Ag@MOF platform was fabricated by the self-assembly of Ag@MOF particles into a multilayered ensemble by drying a droplet containing 5 mg/mL Ag@MOF solution at ambient conditions, as shown in FIG. 6.

0.5 cm×0.5 cm Si (100) substrates were cleaned prior to assembly of Ag nanocubes using oxygen plasma (FEMTO SCIENCE, CUTE-MP/R, 100 \N) for 5 minutes. 20 μL of the 1-propanol solution of Ag@MOF particles (with concentration of 5 mg/mL as prepared in General Procedure 2) was dispensed via pipette on the substrates and let dry in a controlled manner. Typically, the substrate was dried indoors at room temperature without exposure to external elements such as wind and light, which allows slow and controlled removal of 1-propanol due to its relatively high boiling point.

The resulting platform was characterized by SEM, briefly, a multilayered substrate was cut into half using a glass cutter. The cut piece was positioned 90° away from the top down electron beam such that the cut side was exposed. According to the SEM images, the platform is a 1.3±0.2 μm thick (10-15 layers) close-packed assembly of multiple Ag cores within a collective MOF shell structure (FIGS. 1A(ii), 7) with an interparticle distance of <10 nm. The small interparticle distance is advantageous for SERS application because it allows strong plasmonic coupling among neighboring Ag cubes to form intense SERS hotspots for ultra-sensitive sensing. The platform is homogenous in thickness over a large area (mm scale), as shown in cross-section SEM images, providing ease of alignment especially from stand-off distances (because it is hard to control laser point to a specific spot).

The 3D Ag@MOF platform was then characterized in terms of SERS hotspots using confocal Raman microscopy. 4-methylbenzenethiol (4-MBT) was employed as the probe molecule due to its strong and distinct vibrational fingerprints at 1077 $cm^{-1}$ ($v_{CS}$, $\beta_{CCC}$) for SERS characterization/imaging. Hyperspectral x-y-z SERS imaging reveals the 3D SERS active volume of the multilayered platform (FIG. 1A(iii)), clearly indicating that plasmonic hotspots are intense and distributed homogeneously over all spatial directions.

The relative standard deviation (% RSD) of SERS intensity using the 3D Ag@MOF platform is only <9% over a large x-y area of several $mm^2$, and <10% along its x-z plane (FIG. 8).

The Ag@MOF platforms, before or after thermal activation, contain unique XRD patterns of both MOF (ZIF-8) and Ag nanocubes. This indicates the successful formation and the high stability of Ag@MOF platform during thermal activation and reaction.

Effect of Particle Concentration on Thickness of 3D Ag@MOF Platform

The thickness of the 3D SERS platform varies depending on the concentration of Ag@MOF particles added. By varying the concentration from 0.5 to 20 mg/mL, platforms of varying thickness from 0.1 µm to 10 µm were fabricated.

The concentration of Ag@MOF particles required also varies when used on varying areas of Si substrates for the same Ag@MOF thickness. For example, if a larger substrate is used, a higher concentration of Ag@MOF particles is required to obtain the same thickness.

Effect of 3D Ag@MOF Platform Thickness on SERS Active Depth

Ag surfaces was modified with 4-MBT and x-z hyperspectral SERS imaging were performed on various MOF-SERS platforms with thickness ranging from ~0.2±0.1 µm (1-2 layers) to 9.2±0.8 µm (40-45 layers, FIGS. 1C, 10). The effective SERS-active depth was determined using the FWHM value of SERS intensity-distance profile obtained during x-z SERS imaging.

Notably, the SERS-active depth increases from 0.5 µm to 1.2 µm as physical platform thickness increases from 0.2 µm (1-2 layers) to 1.3 µm (10-15 layers). The hotspot thickness eventually plateaus at ~1.2 µm (FIG. 1D) even when platform thickness increases beyond 1.3 µm. This highlighted the importance of thicker SERS platforms to larger SERS hotspot volume to better utilize the laser excitation volume as compared to thin platforms (FIG. 1C).

Example 2: Extent of 4-MBT Penetration on the 3D Ag@MOF Platform, as Compared to Other SERS Platforms, Measured Using Confocal Raman Microscopy The analyte-sorbing capability of the 3D Ag@MOF platform were compared with two other 3D SERS platforms involving (1) pre-assembled Ag nanoparticles top-coated with a MOF layer (~200 nm) and (2) pre-assembled Ag nanoparticles without MOF.

Experimental

A multilayered Ag nanocube substrate (2) was assembled by the following procedure. 0.5 cm×0.5 cm Si (100) substrates were cleaned prior to assembly of Ag nanocubes using oxygen plasma (FEMTO SCIENCE, CUTE-MP/R, 100 \N) for 5 min. 20 µL of the 1-propanol solution of Ag nanocubes (after filtration, with concentration of 0.5-20 mg/mL Ag nanocubes, prepared according to General Procedure 1 and stored initially in ethanol solvent and re-dissolved in 1-propanol by centrifugation and sonication shortly before multilayer substrate assembly) was dispensed via pipette on the substrates and let dry. The coated substrate was submerged in hydrochloric acid (0.01 M) for 3 hours to remove PVP surface groups on Ag nanocubes. Multilayered Ag nanocube substrate (2) was obtained.

A multilayered Ag nanocube substrate top-coated with ZIF film (1) was assembled by performing ZIF coating on the multilayered Ag nanocube substrate (2). 2 ml of methanolic $Zn(NO_3)_2$ (25 mM) was added to 2 ml of methanolic 2-methylimidazole (mIM; 50 mM) and mixed quickly for 5 s. For one growth cycle, the Ag nanocube substrate (2) (9~10 layers, ~5 mg/mL Ag nanocube solution) was immersed in the solution for 40 minutes, and then washed with copious amount of methanol and dried with nitrogen gas several times to remove excess ZIF crystals. The procedure was repeated 2 more times using fresh $Zn(NO_3)_2$ and 2-methylimidazole solutions to obtain ZIF film of ~200 nm (standardized Ag/MOF ratio with Ag@MOF platform). The ZIF film on multilayered Ag nanocube substrate (1) achieves a thickness of 1.3 µm with ~10 layers of Ag cube and 200 nm MOF.

All SERS platforms were initially exposed to gaseous 4-MBT for 2 h and upon saturation, characterized in terms of SERS hotspots using confocal Raman microscopy. Specifically, each SERS platform was placed in a 3D-printed chamber containing 0.5 g solid 4-MBT (which sublime during the exposure). The 3D-printed chamber was prepared according to procedure "Preparation of 3D-printed chamber for airborne chemicals" and has a volume of 5 cm×5 cm×5 cm (0.125 L). The SERS platforms were collected after 2 hours (when the absorption has achieved saturation) and subjected to confocal x-z hyperspectral imaging to determine the penetration depth of gaseous 4-MBT. They were analyzed by tracking the signature 4-MBT signal (at 1077 $cm^{-1}$) along the z-direction to determine the penetration depth of analyte molecules into respective platforms. SERS spectra were obtained with time-lapsed mode every 10 second with 10 second collection time.

Results and Discussion

Using 4-MBT's characteristic band at 1077 $cm^{-1}$, it was observed that Ag@MOF platform allows deepest analyte penetration with a depth of 1.3±0.1 µm (or 1.27±0.1 µm), as determined by the full-width half-maximum (FWHM) of the SERS intensity-distance profile scanned along the x-z plane (FIGS. 1B, 9). In contrast, the two control platforms exhibit >2-fold shorter penetration depths at ~0.5±0.1 µm. These observations affirm that the multilayered Ag@MOF is able to absorb analyte molecule more efficiently, thereby giving the higher apparent penetration depth.

Without wishing to bound by theory, the better performance of multilayered Ag@MOF platform was attributed to its porous and more homogeneous distribution of analyte-sorbing MOF moiety throughout the whole platform, which allows airborne molecules to populate the entire 3D hotspot volume. On the other hand, Ag assembly top-coated with MOF (1) does not possess MOF moiety throughout its z-direction and it can only absorb molecules at its top layer. Bare Ag assembly without MOF platform (2) does not have any analyte capturing ability and only relies on chemisorption of 4-MBT on Ag surfaces.

It is believed that one additional factor contributing to the intensity or better performance is that the MOF coating in Ag@MOF enables a more spaced assembly, which allows better laser penetration than the highly close-packed assemblies in other platforms.

Example 3: Effect of 3D Ag@MOF Platform Thickness on SERS Enhancement Factor (SERS EF) Using Stand-Off SERS Detection Stand-off SERS detection was realized by integrating the 3D Ag@MOF platform with a stand-off Raman system with large collection volume of 1 mm×1 mm×3.9 mm for x, y, z, respectively. 4-MBT signals across Ag@MOF platforms (pre-modified with 4-MBT) of various thicknesses were measured.

Experimental

The overall set-up of the stand-off SERS system is depicted in FIG. 2A. The optical set-up of the stand-off Raman system with excitation and collection beam aligned in the same path is depicted in FIG. 11. A portable stand-off Raman spectrophotometer that couples the excitation laser and collection light through the same path via a camera lens was employed. This provides automated alignment and better flexibility for on-site measurements than other telescopic systems whereby laser is excited from a different angle and requires tedious re-alignment for every sample. SERS spectra were obtained with time-lapsed mode every 1 second with 1 second collection time for characterization of 4-MBT pre-modified substrates.

The stand-off SERS system was positioned at a distance of 2 meters (which is also the default distance used for subsequent examples, unless otherwise stated) from a 3D-printed chamber carrying the Ag@MOF platforms. The 3D-printed chamber were prepared according to procedure "Preparation of 3D-printed chamber for airborne chemicals" and has a volume of 5 cm×5 cm×5 cm (0.125 L).

Ag@MOF platforms of varying thickness from 0.2 μm to 9.2 μm (prepared according to Example 1, wherein the Ag nanocubes were functionalized with 4-MBT) were used to compare SERS signal intensity.

Results and Discussion

TABLE 2

The measured stand-off intensity ($I_{SERS}$) of 4-MBT across pre-functionalized platforms of different thickness.

| Platform thickness (μM) | 0.3 | 0.7 | 1.3 | 4.1 | 9.2 |
|---|---|---|---|---|---|
| $I_{SERS}$ (counts) | 237 | 638 | 1041 | 991 | 1026 |
| $I_{solution}$ (counts) | 62.8 (1884 seconds over 30 seconds, 1M 4-MBT solution) | | | | |

The SERS EF for multilayered Ag@MOF platform was calculated from the formula below. The 4-MBT molecules were assumed to be assembled as a monolayer on the particle surface.

$$\text{SERS EF} = I_{SERS}/I_{solution} \times N_{solution}/N_{SERS},$$

where:
$I_{SERS}$ and $I_{solution}$ represent the stand-off intensities obtained from platforms of varying thickness and a 1M 4-MBT solution, respectively;
$N_{solution}$ represents number of molecules in solution within the measured laser spot (laser spot diameter=~1 mm; focal depth=~3.9 mm); and
$N_{SERS}$ represents number of 4-MBT molecules on surface of Ag cubes within the measured laser volume.

A ~5-fold increase in intensity was observed when the MOF-SERS platform thickness increases from 0.2 μm to 1.3 μm (237±30 counts to 1041±150 counts), which corresponds to an increment of stand-off SERS EF from $3.5 \times 10^6$ to $6.4 \times 10^6$ (FIG. 2B).

The stand-off SERS signal intensity and calculated EF plateaus at ~1000 counts and ~$6.2 \times 10^6$ as the platform thickness increases further from 1.3 μm to 4.1 μm and 9.2 μm. This stand-off result is in agreement with the aforementioned trend in confocal SERS imaging in Example 1, affirming that the optimal thickness for multilayered Ag@MOF platform based on the imaging system used herein is 1.3 μm, equivalent to 10-15 layers of Ag@MOF particles (which is the platform thickness used in subsequent examples). Overall, the finding indicates that thick Ag@MOF platforms with micron-size hotspot volume are essential to maximize the hotspot population within the laser collection volume and further boost the SERS intensity of target molecules.

Example 4: Stand-Off SERS Detection and Quantification of Aerosolized and Gaseous 4-MBT Using the 3D Ag@MOF Platform To demonstrate the ability to detect airborne species using the 3D Ag@MOF platform and the stand-off SERS system of Example 3, aerosolized 4-MBT (500 ppm) were introduced near the platform and the time-dependent and stand-off SERS responses from the analyte molecules were concurrently measured. This experiment was performed using Ag nanocubes cleaned with HCl and not using Ag particles that were pre-modified with 4-MBT to ensure a more accurate evaluation on the overall sorption kinetics of Ag@MOF ensemble (FIG. 2C).

SERS Detection of Aerosolized Chemicals

Solutions of analytes (e.g. 4-MBT) were loaded into commercially available 'Nano Handy Mist Spray' (SKG brand), and expelled out as aerosols. It was estimated that 1 second of spraying produces a total of 50 μL of airborne aerosol. Aerosols were introduced into the 3D-printed chamber using the mist sprayer from the top opening. The SERS platforms were mounted at one side of the walls of the 3D-printed chamber.

Stand-off SERS measurement was performed in-situ for the entire duration (before, during and after spraying of airborne analytes). SERS spectra were obtained with time-lapsed mode every 10 seconds with 10 seconds collection time for detection of airborne 4-MBT. About 5-10 SERS spectra were averaged and baselined for each analyte concentration.

To measure the distance-dependent signal intensity at different distances, the detection were performed at 2 meter to 4, 6, 8 and 10 meters away from the lens (FIG. 13) and signals were recorded. Spectra when the substrate was saturated were analyzed for intensity.

SERS Detection of Gaseous 4-MBT

Instead of aerosolized 4-MBT, 0.5 g solid 4-MBT was put in the chamber. Stand-off SERS measurement was performed in-situ as the solid sublimed. SERS spectra were obtained with time-lapsed mode every 10 second with 10 second collection time.

Results and Discussion

The multilayered Ag@MOF platform rapidly recorded 4-MBT SERS signature within 10 s, which gradually reaches an intensity of >5000 counts within 30 s (FIG. 2D) of aerosol exposure.

In contrast, control platforms as discussed in Example 2 comprising of pre-assembled Ag top-coated with MOF (comparative substrate (1)) and pre-assembled Ag without MOF (comparative substrate (2)) exhibited 6-fold poorer signals within similar time periods of 30 s (FIG. 2D). Using a Lagergren pseudo first-order adsorption kinetics, it was found that the multilayered Ag@MOF platform displays the highest sorption constant of k=55 ms$^{-1}$, which is 10-fold higher than the other control platforms. It is also noteworthy that no signal was detected in the absence of plasmonic particles, indicating that normal stand-off Raman detection is inapt for airborne analyte detection (FIG. 2D).

The 4-MBT intensity obtained in the detection of gaseous 4-MBT between different substrates is shown in FIG. 12. The combined results from aerosolized and gaseous analytes demonstrate the better analyte sorptivity and corresponding SERS sensitivity of multilayered Ag@MOF platform over other platform configurations towards the detection of airborne species in both aerosolized and gaseous forms.

Effect of Stand-Off Distance on Signal Intensity

The detection of analytes at further distances exemplifies the potential of the platform for use in real-life detection tasks at border, river or mountainous geographical areas. Detection was performed at 2 meter to 4, 6, 8 and 10 meters away from the lens and signals are recorded to measure the distance-dependent signal intensity at different distances.

The platform exhibits 4-MBT signals at extended stand-off distances from 2 meters up to 10 meters and outperforms the normal stand-off Raman detection at every distance (FIG. 2E, FIG. 13).

While the signal intensity decreases with distance (Raman intensity $\propto 1/d^2$), these results was achieved using a 8-fold lower laser power ($\leq 55$ mW) instead of other common stand-off Raman techniques with ultrahigh laser power of >400 mW. This feature is a significant advancement in stand-off Raman spectroscopy, especially in enhancing safety for the operator's eye and skin.

Detection Limit and Signal Consistency

The platform can detect down to 50 ppb of aerosolized 4-MBT (corresponding to the airborne concentration of a pulse of aerosolized 4-MBT), at which >100 counts of distinct 4-MBT's vibrational signature at 1077 $cm^{-1}$ were observed (FIG. 14). This detection limit corresponds to a high analytical enhancement factor (AEF) of $5 \times 10^6$. The AEF was calculated by the formula below:

$$AEF = [(I_{SERS})/(I_{Raman})] \times [(C_{Raman})/(C_{SERS})],$$

where $C_{SERS}$ and $C_{Raman}$ are the corresponding concentrations of the stock solution to prepare aerosolized 4-MBT to be measured using the platform ($10^{-6}$ M; 50 ppb) and normal stand-off Raman of 4-MBT(1 M, 50000 ppm), respectively;

$I_{SERS}$ and $I_{Raman}$ are the time-normalized intensities measured using SERS and normal stand-off Raman, respectively, at their corresponding concentration.

The SERS spectra collected across different concentrations from 500 ppm to 50 ppb enables the construction of a standard calibration curve using partial least square (PLS) regression, which in turn allows subsequent quantification of analyte concentration (FIG. 2F). The calibration curve exhibits an ideal 0.997 linear coefficient, this demonstrates that the SERS substrate described herein provides a reliable platform to identify and quantify highly dispersed molecules in air.

A stable and consistent signal intensity (relative standard deviation in intensity is $\leq 1.8\%$) were observed for a continuous period of 300 seconds after the platform has been saturated with 4-MBT molecules (FIG. 2G). This clearly indicates that both the Ag@MOF SERS platform and the optical instrument are highly robust and not affected by external disturbances, such as air perturbation, that results in intensity fluctuation during prolonged measurements.

Example 5: Remote SERS Sensing of $CO_2$ Using 3D Ag@MOF Platform—a Demonstration of Actual Air Monitoring with Specific Fingerprints and High Responsiveness One potential application of the 3D Ag@MOF platform is its usage as a highly responsive remote air monitoring device to provide real-time readout of specific vibrational fingerprints of small gaseous molecules that do not have specific affinity with metal surface. Commercial air monitoring devices installed in households and buildings rely heavily on the photoelectric method that does not provide molecular fingerprints, is prone to false alarms, and usually requires >15 minutes to recognize abnormal air composition.

As a proof-of-concept, the remote and real-time SERS sensing of gaseous carbon dioxide ($CO_2$) with high molecular specificity were demonstrated, showcasing the potential of the platform as an ideal alternative to conventional detectors.

Experimental

The thermal-activated 3D Ag@MOF platform was positioned within a gas flow cell that was connected to a $CO_2$ source (50 sccm and 1 atm) and SERS signals were recorded in consecutive $CO_2$-vacuum cycles (FIG. 3A). The Ag surface was pre-modified with 4-MBT to provide an internal standard, whereby all spectra were standardized against 4-MBT's signal to eliminate signal fluctuations (FIG. 3B). The stand-off SERS system was set up in the same manner as in Examples 3 and 4 at a stand-off distance of 2 metres.

The gas flow cell was first flushed with $N_2$ gas (50 sccm) for 30 min to displace air. Following which, $CO_2$ gas (50 sccm) was flown through the gas flow cell and stopped after 15-20 minutes. The cell was then vacuumed for 15-20 minutes. $CO_2$ gas (50 sccm) was flown through again and the cycle was repeated. Stand-off SERS measurement was performed in-situ for the entire duration (time-lapsed mode every 5 minutes with 30 seconds collection time). Subsequent purging of the experimental set-up with $N_2$ gas and simultaneous SERS analysis were conducted until characteristic SERS bands remain constant in the SERS spectra (30 min). All gas flows were precisely controlled using precision gas mass flow controllers (model number MC-100SCCM-D) obtained from Alicat Scientific, Inc. All SERS spectra were normalized between 0 (min) and 1 (max) and their SERS intensities (I) were based on the relative intensity of 4-MBT internal standard.

Results and Discussion

As $CO_2$ exposure increases, a new broad SERS band centered at 1360 $cm^{-1}$ emerged rapidly within 5 min (FIG. 3B). Notably, this broad band diminishes as soon as the cell was evacuated under vacuum. Repetitive appearance and disappearance of the 1360 $cm^{-1}$ band was observed when Ag@MOF SERS platform was subjected to continuous cycling between $CO_2$ flow and vacuum evacuation, respectively. This observation clearly denotes the high reversibility of the sorption and desorption of $CO_2$ gas molecules in the 3D Ag@MOF platform, a feature critical for application in real-time and reusable stand-off SERS monitoring of airborne species.

In contrast, a control experiment involving nitrogen gas ($N_2$) does not exhibit any vibrational feature near the 1360 $cm^{-1}$ region (FIG. 3C). Principle component analysis (PCA, an analysis to differentiate spectra based on algorithms applied on their spectral features) further affirms that SERS signatures obtained when exposed to $CO_2$ or $N_2$ are statistically different. The SERS band centered at 1360 $cm^{-1}$ is thus attributed to the symmetric stretching mode of $CO_2$ ($v_{CO2}$) molecules accumulated at solid-MOF interface.

Given the results, the proposed approach offers a rapid and molecular-specific recognition of small gas molecules to prevent/minimize false positive, even for molecules that do not have specific affinity with metal surface using their specific vibrational fingerprints. Moreover, the proposed stand-off SERS detection gives real-time results without tedious air sampling procedures, which is a significant advantage over conventional sensors which require preconcentration of gas molecules using electrodeposition or ultralow temperature (−80° C.).

Example 6: Multiplex Outdoor Sensing of Cyclic Aromatic Hydrocarbons Using 3D Ag@MOF Platform To simulate a real-life multiplex sensing scenario in air quality monitoring, a series of outdoor detection of aerosolized mixture of (poly)cyclic aromatic hydrocarbons (PAH), naphthalene and toluene (FIGS. 4A and 4B), which are major pollutants commonly found in haze, were performed.

Laboratory Signal-to-Concentration Calibration for Mixtures of Naphthalene (Nap) and Toluene (Tol)

A signal-to-concentration calibration was first conducted under controlled laboratory conditions for various compositions of a mixture of naphthalene (Nap) and toluene (Tol), ranging from Nap/Tol 15:85 (mol/mol, airborne concentration 850:3500 ppm, respectively) to Nap/Tol 1:99 (49:3500 ppm) (FIG. 15). Aerosolized PAH were introduced into the 3D-printed chamber over a period of 5 second, equivalent to 250 μL. The solution used for spraying contains 3 mL (2.61 g) of toluene and several concentrations of naphthalene (0.632 g for Nap/Tol 15:85 sample, 0.384 g for Nap/Tol 10:90 sample, 0.19 g for Nap/Tol 5:95 sample, 0.0362 g for Nap/Tol 1:99 sample). With this the amount of each component in the stock solution and in 250 μL of aerosol can be determined, which allows the calculation of airborne concentration in ppm (or ppb) by taking into account the volume of the chamber (0.125 L) (Table 3).

TABLE 3

Airborne concentration of polycyclic aromatic hydrocarbonds (PAH) in terms of ppm/ppb across different Nap/Tol ratios

| | Sample | | | |
|---|---|---|---|---|
| Nap/Tol ratio | 15:85 | 10:90 | 5:95 | 1:99 |
| Toluene (ppm) | 3500 | 3500 | 3500 | 3500 |
| Napthalene (ppm) | 850 | 515 | 255 | 49 |

By introducing the aerosol mixture in vicinity to the Ag@MOF platform, multiplex spectra exhibiting characteristic vibrational fingerprints unique of each analytes were collected within 10 s using the stand-off SERS setup of Example 3. The SERS bands of naphthalene at 763 cm$^{-1}$ ($\delta_{CH}$) and 1380 cm$^{-1}$ ($v_{C-C}$) as well as toluene signatures at 786 cm$^{-1}$ ($\delta_{CH}$) and 1004 cm$^{-1}$ (symmetric $v_{C-C\ (ring)}$) in different intensity ratio according to the mixture composition were observed (FIG. 15A).

For instance, the intensity ratio of Nap (763 cm$^{-1}$)/Tol (786 cm$^{-1}$) increases from (0.12±0.05) to (0.86±0.1) as the Nap/Tol ratio was increased from 1:99 to 15:85 (FIG. 15), respectively. Such spectral features enable the accurate quantification of each component content within the multiplex detection, as shown in the predicted PLS model and PCA score plot (FIGS. 15c, 16). These results demonstrate the ability to remotely measure the concentration of airborne molecules down to tens of ppm level, which is also the permitted threshold set by the Occupational Safety and Health Administration (OSHA).

Stand-Off SERS Quantification of PAH Composition in an Outdoor Setting

The stand-off outdoor experiment was performed in daytime before 5 pm (Singapore time) at level 6 open area within the Division of Chemistry and Biological Chemistry, School of Physical and Mathematical Sciences, NTU. The experimental procedures for the introduction and detection of aerosolized analytes were performed in accordance with the procedure entitled "SERS detection of aerosolized chemicals" in Example 4.

Real-time SERS spectra evidently display the signature vibrational signals of target molecules amidst the background interference (FIGS. 4C, 4D, 17). Upon background subtraction and baseline correction, the outdoor spectra of Nap/Tol 15:85 and 5:95 samples match well with the calibration spectra, whereby the relative intensity ratio of Nap/Tol SERS bands at 763 cm$^{-1}$/786 cm$^{-1}$ or 1380 cm$^{-1}$/1004 cm$^{-1}$ were in line with those in the calibration graph (FIGS. 4E, 18).

This result clearly showcases the first stand-off SERS sensor capable of remotely quantifying multiple airborne species in both lab-based and outdoor environments at high accuracy. Such rapid sorption and identification of foreign molecules in the atmosphere allows timely and adequate actions to be taken in the event of adverse weather, disaster and terrorism, while ensuring safety of operators when performed at remote distances.

CONCLUSION

A real-time, stand-off SERS detection of airborne molecules was achieved by integrating stand-off Raman with a 3D Ag@MOF platform having a micron-scale hotspot volume and a high molecule-sorbing capability. By providing an immense hotspot population within the stand-off laser collection volume, the platform enables the rapid quantitative detection of aerosolized chemicals with parts-per-billion (ppb) detection limit at 2-10 meters away. Real-time stand-off monitoring of small gas molecules was also achieved in multiple on-off cycles, exemplifying the potential application of the platform in prolonged atmospheric monitoring.

Notably, the stand-off 3D platform can rapidly elucidate the fingerprints of multiple airborne polyaromatic hydrocarbons in an outdoor environment under strong daylight intensity, demonstrating its ability to afford target analyte signals in spite of background interference. These collective advantages of the platform tackle the current limitations in remote Raman spectroscopy and sets new pathways in air monitoring at the molecular level, which also creates a new paradigm in employing SERS as the next-generation sensing technology to address the pressing issues in the field of remote monitoring for atmospheric/environmental sciences, disaster prevention and homeland defense.

The invention claimed is:

1. A composite material suitable for use in surface-(Currently Amended) enhanced Raman scattering, the material comprising:
   a substrate layer having a surface;
   a plurality of layers of core-shell particles formed on the surface of the substrate layer, wherein:
   the core-shell particles comprise:
      a core formed from a single plasmonic metal nanoparticle; and
      a single shell layer formed from a metal-organic framework; and
   the plurality of layers of core-shell particles provides at least 10 layers of core-shell particles and a thickness of at least 1.3 μm on the surface of the substrate layer.

2. The composite material according to claim 1, wherein the plasmonic metal nanoparticles are plasmonic silver nanoparticles.

3. The composite material according to claim 1, wherein the plasmonic metal nanoparticles are provided as nanocubes.

4. The composite material according to claim 1, wherein one or more of the following apply:
   (a) the core-shell particles in the plurality of layers are packed with an interparticle distance of less than 10 nm;
   (b) the core-shell particles have a size of from 100 nm to 1,000 nm, such as from 200 to 600 nm;
   (c) the shell layer has a thickness of from 5 nm to 100 nm;
   (d) a surface of the plasmonic metal nanoparticles is bonded to 4-methylbenzene thiol;
   (e) the substrate is a silicon substrate.

5. The composite material according to claim 1, wherein:
   the plasmonic metal nanoparticles are silver nanocubes;
   the metal organic framework is ZIF-8; and
   the plurality of layers of core-shell particles are provided in from 10 to 15 layers and provide a thickness of about 1.3 µm.

6. A method of forming a composite material according to claim 1, which method comprises:
   (ci) providing a substrate having a surface and a solution comprising a solvent and core-shell particles comprising:
      a core formed from a plasmonic metal nanoparticle; and
      a shell formed from a metal-organic framework; and
   (cii) placing a portion of the solution onto the surface of the substrate and allowing the solvent to evaporate to provide the composite material.

7. The method according to claim 6, wherein the solvent in the solution is an organic alcohol that has three or more carbon atoms and is linear or branched.

8. The method according to claim 6, wherein the concentration of the core-shell particles is from 0.5 to 20 mg/mL and the substrate has a surface area of from 0.5×0.5 cm.

9. A kit of parts comprising:
   (bi) a composite material as described claim 1; and
   (bii) an excitation and detection means or apparatus.

10. A method of detecting one or more of a gas and a volatile organic chemical, the method comprising the steps of:
   (i) placing a composite material as described claim 1 at a target site for a period of time;
   (ii) using an excitation and detection means or apparatus to provide an excitation signal to the composite material at the target site; and
   (iii) detecting a surface-enhanced Raman scattering signal produced by the excitation signal in the composite material at the target site and determining whether the one or more of a gas and a volatile organic compound is present in the composite material, wherein
   the detection means or apparatus is set at a distance of up to 20 metres away from the composite material at the target site.

* * * * *